US010630660B1

(12) United States Patent
Kumar et al.

(10) Patent No.: US 10,630,660 B1
(45) Date of Patent: *Apr. 21, 2020

(54) METHODS AND APPARATUS FOR DYNAMIC AUTOMATED CONFIGURATION WITHIN A CONTROL PLANE OF A SWITCH FABRIC

(71) Applicant: Juniper Networks, Inc., Sunnyvale, CA (US)

(72) Inventors: Jainendra Kumar, Fremont, CA (US); Vineet Dixit, Bellevue, WA (US); Prabhu Seshachellum, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/421,332

(22) Filed: Jan. 31, 2017

Related U.S. Application Data

(60) Continuation of application No. 14/573,880, filed on Dec. 17, 2014, now Pat. No. 9,577,879, which is a
(Continued)

(51) Int. Cl.
*H04L 29/06* (2006.01)
*H04L 12/46* (2006.01)
(Continued)

(52) U.S. Cl.
CPC ........ *H04L 63/061* (2013.01); *H04L 12/4641* (2013.01); *H04L 41/0806* (2013.01);
(Continued)

(58) Field of Classification Search
CPC ... H04L 63/061; H04L 63/02; H04L 63/0876; H04L 61/6022; H04L 41/0806; H04L 12/4641
See application file for complete search history.

(56) References Cited

U.S. PATENT DOCUMENTS 5,138,615 A 8/1992 Lamport
5,751,967 A 5/1998 Raab et al.
(Continued)

FOREIGN PATENT DOCUMENTS

EP 1318628 A1 6/2003
EP 1892905 A1 2/2008
(Continued)

OTHER PUBLICATIONS

Kamy Kavianian "Advancing Security in Storage Area Networks", Computer Technology Review, Fourth Quarter, 2001, p. 40-45.
(Continued)

*Primary Examiner* — Catherine Thiaw
(74) *Attorney, Agent, or Firm* — Cooley LLP

(57) ABSTRACT

In one embodiment, a method includes receiving a first identifier and a private key after a network device has been included in a data center switch fabric control plane, authenticating the network device based on the private key, sending a second identifier to the network device, and sending a control signal to the network device based on the second identifier. The first identifier is associated with the network device and unique within a segment of the data center switch fabric control plane. The second identifier is unique within the segment of the data center switch fabric control plane.

20 Claims, 8 Drawing Sheets

Related U.S. Application Data division of application No. 12/415,504, filed on Mar. 31, 2009, now Pat. No. 8,918,631.

(51) Int. Cl.
*H04L 12/24* (2006.01)
*H04L 29/12* (2006.01)

(52) U.S. Cl.
CPC .......... *H04L 61/6022* (2013.01); *H04L 63/02* (2013.01); *H04L 63/0876* (2013.01)

(56) References Cited

U.S. PATENT DOCUMENTS

| | | | |
|---|---|---|---|
| 5,801,641 A | 9/1998 | Yang et al. |
| 5,825,772 A | 10/1998 | Dobbins et al. |
| 5,913,921 A | 6/1999 | Tosey et al. |
| 5,926,473 A | 7/1999 | Gridley |
| 5,987,028 A | 11/1999 | Yang et al. |
| 6,075,773 A | 6/2000 | Clark et al. |
| 6,212,183 B1 | 4/2001 | Wilford |
| 6,246,692 B1 | 6/2001 | Dai et al. |
| 6,393,026 B1 | 5/2002 | Irwin |
| 6,553,028 B1 | 4/2003 | Tang et al. |
| 6,609,153 B1 | 8/2003 | Salkewicz |
| 6,639,910 B1 | 10/2003 | Provencher et al. |
| 6,654,373 B1 | 11/2003 | Maher, III et al. |
| 6,658,481 B1 | 12/2003 | Basso et al. |
| 6,816,486 B1 | 11/2004 | Rogers |
| 6,823,454 B1 | 11/2004 | Hind et al. |
| 6,865,673 B1 | 3/2005 | Nessett et al. |
| 6,868,082 B1 | 3/2005 | Allen, Jr. et al. |
| 6,934,260 B1 | 8/2005 | Kanuri |
| 7,173,931 B2 | 2/2007 | Chao et al. |
| 7,230,947 B1 | 6/2007 | Huber et al. |
| 7,233,568 B2 | 6/2007 | Goodman et al. |
| 7,245,629 B1 | 7/2007 | Yip et al. |
| 7,248,760 B1 | 7/2007 | Corbalis et al. |
| 7,277,429 B2 | 10/2007 | Norman et al. |
| 7,289,513 B1 | 10/2007 | Medved et al. |
| 7,315,897 B1 | 1/2008 | Hardee et al. |
| 7,330,467 B2 | 2/2008 | Sharma |
| 7,369,561 B2 | 5/2008 | Wybenga et al. |
| 7,406,038 B1 | 7/2008 | Oelke et al. |
| 7,408,927 B2 | 8/2008 | George |
| 7,415,034 B2 | 8/2008 | Muller et al. |
| 7,415,627 B1 | 8/2008 | Radhakrishnan et al. |
| 7,428,219 B2 | 9/2008 | Khosravi |
| 7,437,469 B2 | 10/2008 | Ellanti et al. |
| 7,471,676 B2 | 12/2008 | Wybenga et al. |
| 7,596,614 B2 | 9/2009 | Saunderson et al. |
| 7,630,373 B2 | 12/2009 | Okuno |
| 7,664,123 B2 | 2/2010 | Smith et al. |
| 7,675,912 B1 | 3/2010 | Ward et al. |
| 7,698,394 B2 | 4/2010 | Helmerich |
| 7,702,765 B1 | 4/2010 | Raszuk |
| 7,715,382 B2 | 5/2010 | Lakshman et al. |
| 7,792,993 B1 | 9/2010 | Hopprich et al. |
| 7,826,393 B2 | 11/2010 | Okita |
| 7,869,436 B1 * | 1/2011 | Adler .................. H04L 12/4641 370/351 |
| 7,877,483 B1 | 1/2011 | Finn |
| 8,089,904 B2 | 1/2012 | Balasubramaniam et al. |
| 8,798,045 B1 | 8/2014 | Aybay et al. |
| 8,918,631 B1 | 12/2014 | Kumar et al. |
| 9,577,879 B1 | 2/2017 | Kumar et al. |
| 2002/0009078 A1 | 1/2002 | Wilson et al. |
| 2002/0051450 A1 | 5/2002 | Ganesh et al. |
| 2002/0110125 A1 | 8/2002 | Banks |
| 2003/0163692 A1 | 8/2003 | Kleinsteiber |
| 2004/0023558 A1 | 2/2004 | Fowler et al. |
| 2004/0064559 A1 | 4/2004 | Kupst et al. |
| 2004/0083295 A1 | 4/2004 | Amara et al. |
| 2004/0254909 A1 | 12/2004 | Testa |
| 2005/0055570 A1 | 3/2005 | Kwan |
| 2005/0114507 A1 | 5/2005 | Tarui et al. |
| 2005/0138346 A1 | 6/2005 | Cauthron |
| 2005/0180438 A1 | 8/2005 | Ko et al. |
| 2005/0232258 A1 | 10/2005 | Wybenga et al. |
| 2005/0246771 A1 | 11/2005 | Hunt |
| 2005/0259597 A1 | 11/2005 | Benedetto et al. |
| 2006/0005185 A1 | 1/2006 | Nguyen |
| 2006/0092975 A1 | 5/2006 | Ansari et al. |
| 2006/0164199 A1 | 7/2006 | Gilde et al. |
| 2006/0165085 A1 | 7/2006 | Konda |
| 2006/0274768 A1 | 12/2006 | Suzuki et al. |
| 2007/0036178 A1 | 2/2007 | Hares et al. |
| 2007/0127367 A1 | 6/2007 | Ogasahara et al. |
| 2007/0153462 A1 | 7/2007 | Crippen et al. |
| 2007/0237148 A1 | 10/2007 | Jabr et al. |
| 2007/0283045 A1 | 12/2007 | Nguyen et al. |
| 2008/0031151 A1 | 2/2008 | Williams |
| 2008/0086768 A1 | 4/2008 | Mirza-Baig |
| 2008/0089323 A1 | 4/2008 | Elias et al. |
| 2008/0112133 A1 | 5/2008 | Torudbakken et al. |
| 2008/0123652 A1 | 5/2008 | Akyol |
| 2008/0130517 A1 | 6/2008 | Lee et al. |
| 2008/0151863 A1 | 6/2008 | Lawrence et al. |
| 2008/0151868 A1 | 6/2008 | Kezys |
| 2008/0165704 A1 | 7/2008 | Marchetti et al. |
| 2008/0186875 A1 | 8/2008 | Kitani |
| 2008/0192648 A1 | 8/2008 | Galles |
| 2008/0214059 A1 | 9/2008 | Rothermel et al. |
| 2008/0219184 A1 | 9/2008 | Fowler et al. |
| 2008/0267090 A1 | 10/2008 | Okita et al. |
| 2008/0320117 A1 | 12/2008 | Johnsen et al. |
| 2009/0034470 A1 | 2/2009 | Nagarajan |
| 2009/0049191 A1 | 2/2009 | Tolliver |
| 2009/0067436 A1 | 3/2009 | Gast et al. |
| 2009/0109963 A1 | 4/2009 | Tanizawa et al. |
| 2009/0219830 A1 | 9/2009 | Venner et al. |
| 2009/0271851 A1 | 10/2009 | Hoppe et al. |
| 2009/0316704 A1 | 12/2009 | Sodder et al. |
| 2010/0091779 A1 | 4/2010 | Juhl et al. |
| 2010/0097926 A1 | 4/2010 | Huang et al. |
| 2010/0180161 A1 * | 7/2010 | Kern .................. G06F 11/2028 714/47.2 |
| 2010/0182933 A1 | 7/2010 | Hu et al. |
| 2011/0004913 A1 | 1/2011 | Nagarajan et al. |
| 2013/0091534 A1 * | 4/2013 | Gilde .................. H04L 63/0227 726/1 |
| 2013/0121321 A1 | 5/2013 | Backes |

FOREIGN PATENT DOCUMENTS

| | | |
|---|---|---|
| EP | 1924030 A1 | 5/2008 |
| EP | 2164209 A1 | 3/2010 |
| EP | 2413550 A1 | 2/2012 |
| GB | 2362289 A | 11/2001 |
| WO | WO-2000/008801 | 2/2000 |
| WO | WO-2008/144927 | 12/2008 |

OTHER PUBLICATIONS

F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.

Cisco Systems, Inc., "Intermediate System-to-Intermediate System (IS-IS) TLVs" Document ID: 5739 [online], Retrieved from the Internet: <URL: http://www.cisco.corn/en/US/tech/tk365/technologies_tech_note091 86a0080094bbd. shtrnl Aug. 10, 2005, 8 pages.

Office Action dated Apr. 28, 2010 for U.S. Appl. No. 12/345,498 (20 pages).

Final Office Action dated Oct. 26, 2010 for U.S. Appl. No. 12/345,498 (21 pages).

(56) References Cited

OTHER PUBLICATIONS

Search Report for European Application No. 11158837.2, dated Jun. 21, 2011, 7 pages.
Extended Search Report for European Application 11175433.9, dated Oct. 7, 2011, 7 pages.
Extended Search Report for European Application 11179603.3, dated Dec. 21, 2011, 8 pages.

* cited by examiner

METHODS AND APPARATUS FOR DYNAMIC AUTOMATED CONFIGURATION WITHIN A CONTROL PLANE OF A SWITCH FABRIC

CROSS REFERENCE TO RELATED APPLICATIONS

This patent application is a continuation of U.S. patent application Ser. No. 14/573,880, entitled "METHODS AND APPARATUS FOR DYNAMIC AUTOMATED CONFIGURATION WITHIN A CONTROL PLANE OF A SWITCH FABRIC" filed Dec. 17, 2014 (now U.S. Pat. No. 9,577,879), which is a divisional of U.S. patent application Ser. No. 12/415,504, entitled "METHODS AND APPARATUS FOR DYNAMIC AUTOMATED CONFIGURATION WITHIN A CONTROL PLANE OF A SWITCH FABRIC" filed Mar. 31, 2009 (now U.S. Pat. No. 8,918,631); the subject matter of both of which is incorporated herein by reference.

BACKGROUND

Embodiments described herein relate generally to methods and apparatus for configuring devices within a control plane of a switch fabric. Some embodiments relate more specifically to dynamic automated configuration of network devices within a control plane of a switch fabric.

Switch fabrics can be used, for example, to route data between multiple network devices and/or storage devices. Each network device and/or storage device can be operatively coupled to the switch fabric and can control data input to and output from the switch fabric. In this manner, each network device and/or storage device can send data to the switch fabric and receive data from the switch fabric.

Control processors can be used to monitor and/or control the operation of the switch fabric. For example, a control processor can be used to maintain and/or distribute a routing table to modules within the various stages of the switch fabric and/or the network devices and/or storage devices configured to interface with the switch fabric. Such a routing table can contain information indicating where modules within the switch fabric, the network devices and/or the storage devices should forward the data such that the data reaches its destination. For example, the routing table can indicate to which module within a second stage of a switch fabric a module within a first stage of the switch fabric should send a particular data packet.

The control processor can be electrically and physically coupled to modules within the switch fabric and/or access switches by multiple cables. If the switch fabric contains a large number of modules and/or if a large number of network devices and/or storage devices are configured to send data to the switch fabric, a large number of cables are typically used. Thus, the number of cables used in the system can be relatively large and potentially unmanageable. Additionally, provisioning the modules, network devices, and storage devices can be a complex and time-intensive task. For example, an administrator typically spends a significant amount to time configuring device identifiers and routing tables to correspond with the physical topology of the network.

Thus, a need exists for a switch fabric system having a relatively few number of physical connections between a control processor and the modules within the switch fabric and/or the access switches. Additionally, a switch fabric system in which modules, network devices, and storage devices can be simply configured would be advantageous.

SUMMARY OF THE INVENTION

In one embodiment, a method includes receiving a first identifier and a private key after a network device has been included in a data center switch fabric control plane, authenticating the network device based on the private key, sending a second identifier to the network device, and sending a control signal to the network device based on the second identifier. The first identifier is associated with the network device and unique within a segment of the data center switch fabric control plane. The second identifier is unique within the segment of the data center switch fabric control plane.

DETAILED DESCRIPTION

Figure 1:
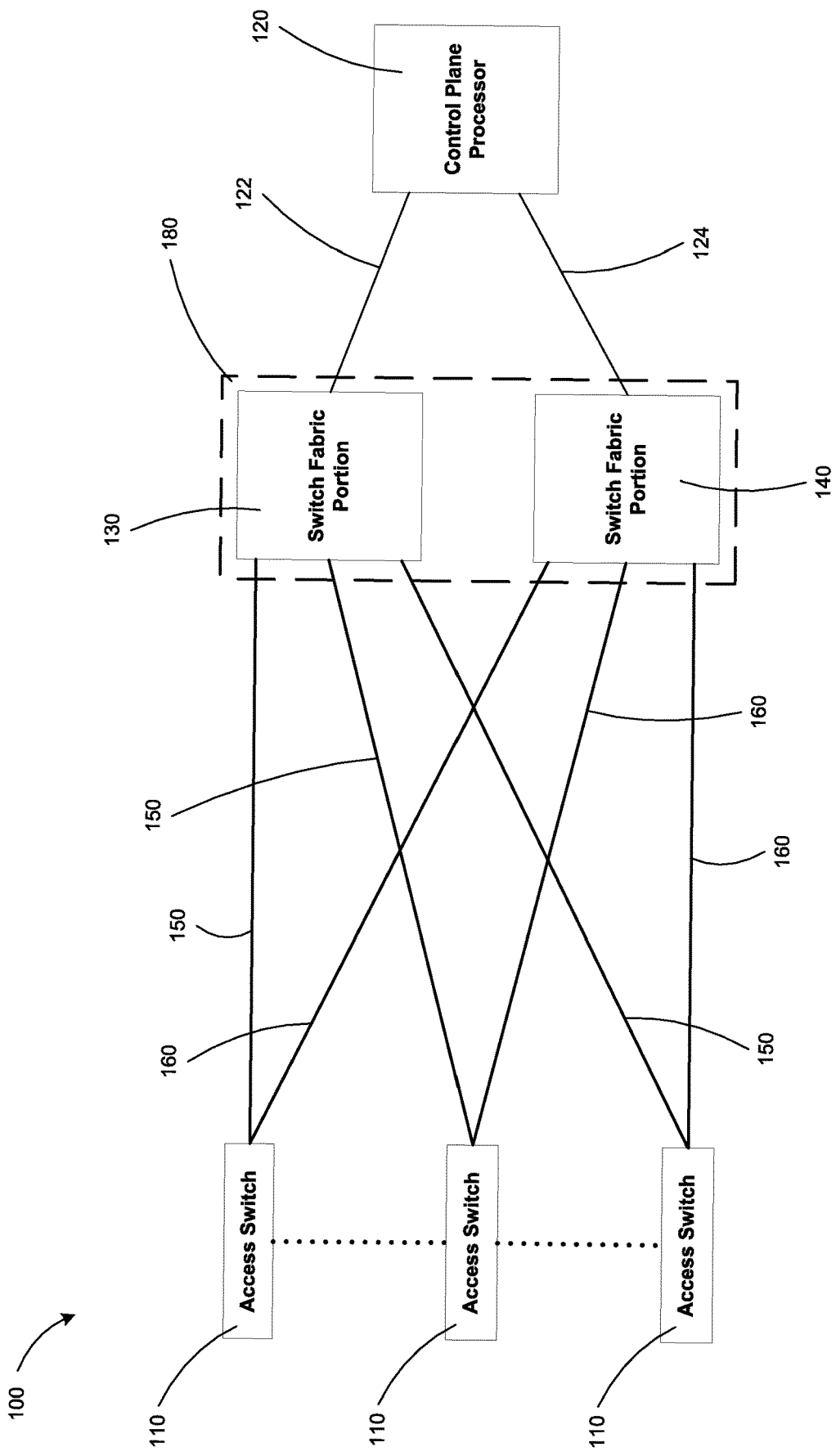
FIG. 1 is a schematic illustration of a switch fabric system, according to an embodiment.

In some embodiments, a system includes multiple access switches, a switch fabric having multiple switch fabric portions, and a control plane processor. Each switch fabric portion is coupled to at least one access switch by a cable from a first set of cables. Each switch fabric portion is configured to receive data from the at least one access switch via the cable from the first set of cables. The control plane processor is coupled to each switch fabric portion by a cable from a second set of cables. The control plane processor is configured to send control information to each access switch via a cable from the second set of cables, a switch fabric portion, and a cable from the first set of cables. Because each cable from the first set of cables can carry both data signals and control signals (i.e., each cable from the first set of cables includes a portion of the data plane of the system and a portion of the control plane of the system, as described in further detail below), if a cable from the first set of cables is inoperable, both control signals and data signals are prevented from being sent via the cable from the first set of cables. Thus, data is sent or transmitted within the data plane of the switch fabric system in response to a control signal within the control plane. In other words, control signals within the control plane affect propagation of data signals within the data plane.

As used herein, the term "control plane" refers to portions of the network devices, components, modules, cables, processors, and/or switches of a switch fabric system through which control signals are transmitted, defined, received, and/or the like. Said another way, the control plane of a switch fabric system is a portion of the switch fabric system that controls the operation of the switch fabric system. Control signals can include any signal configured to control and/or monitor the operation of the switch fabric system. For example, control signals can control and/or monitor the routing of data signals through the switch fabric. A control signal can include, for example, handshaking signals, packet-forwarding information, routing protocols, bridging protocols, error recovery information, routing tables, switch tables, topology-discovery signals, and/or the like.

As used herein, the term "data plane" refers to the portions of the network devices, components, modules, cables, processors, and/or switches of a switch fabric system through which data signals are transmitted, defined, received, and/or the like. Data signals can include any signal that contains data (e.g., the content or payload for which the switch fabric is being used) to be sent between a first network device and/or storage device operatively coupled to the switch fabric system and a second network device and/or storage device operatively coupled to the switch fabric system. Data signals are different than control signals in that data signals are the signals to be transmitted through the switch fabric system and are not used to control and/or monitor the switch fabric system. In other words, data signals transmitted from a first network device to a second network device can propagate within the data plane, and control signals internal to the switch fabric (e.g., control signals with a source and destination within the switch fabric) can propagate within the control plane. In some embodiments, for example, a data signal can include a data packet and/or a portion of a data packet such as a cell. If a portion of a component, module, cable, processor, and/or switch transmits, defines, and/or receives both control signals and data signals, that portion of the component, module, cable, processor, and/or switch is part of the control plane of a switch fabric system with respect to the control functionality and part of the data plane of the switch fabric system with respect to the data functionality.

In some embodiments, a signal, packet, and/or cell includes both a data portion and a control portion. In such embodiments, the portions of a switch fabric system that transmit, define, and/or receive the data portions of the signal are part of the data plane of the switch fabric system. Similarly, the portions of the switch fabric system that transmit, define, and/or receive the control portions of the signal are part of the control plane of the switch fabric system.

As used herein, a data packet refers to any portion of a data message that is to be sent between two nodes within a switch fabric system. When a data packet is sent through a data plane of a switch fabric system, the data packet may be split into multiple smaller data cells and reassembled at various stages of the switch fabric system.

As used in this specification, provisioning can include various types or forms of device and/or software module setup, configuration, and/or adjustment. For example, provisioning can include configuring a network device such as a network access switch, a control plane processor, and/or a switch fabric portion based on a network policy. More specifically, for example, network provisioning can include one or more of the following: configuring a network device to operate as a network router or a network switch; alter routing tables of a network device; update security policies and/or device addresses or identifiers of devices operatively coupled to a network device; selecting which network protocols a network device will implement; setting network segment identifiers such as virtual local area network ("VLAN") tags for a port of a network device; and/or applying access control lists ("ACLs") to a network device. A network device can be provisioned or configured such that rules and/or access restrictions defined by a network policy are applied to data packets that pass through the network device. In some embodiments, virtual devices can be provisioned. A virtual device can be, for example, a software module implementing a virtual switch, virtual router, or virtual gateway that is configured to operate as an intermediary between a physical network and virtual resources hosted by a host device such as a server. In some embodiments, the virtual switch is hosted by the host device. In some embodiments, provisioning can include establishing a virtual port or connection between a virtual resource and a virtual device.

In some embodiments, the control plane processor is configured to determine control plane connections associated with each access switch. Because each cable from the first set of cables includes a portion of the data plane and a portion of the control plane of the system, the control plane processor is configured to determine data plane connections associated with each access switch as a result of the control plane connections, as described in further detail herein. In some embodiments, control signals within a control plane are distributed or transmitted within the control plane as control data packets in an internet protocol ("IP") network. In other words, the control plane can be an IP network of network devices within the control plane.

In some embodiments, a system including a first switch fabric portion, a second switch fabric portion, a first group of access switches, a second group of access switches, a first control plane processor and a second control plane processor can be self-configuring. In other words, the system can configure or provision itself without, for example, input related to network topology and/or interconnections from an administrator.

For example, the first control plane processor and the second control plane processor can negotiate to designate the first control plane processor as a root control plane processor. In some embodiments, the first control plane processor has been active (e.g., powered on) for a longer period of time than the second control plane processor and is designated (or elected) the root control plane processor. The second control plane processor can then authenticate with the root control plane processor by providing a key to the root control plane processor. If the key is valid, the root control plane processor can authenticate the second control plane processor and provide a new identifier to the second control plane processor.

Similarly, the first switch fabric portion and the second switch fabric portion can be authenticated with the root control plane processor and provided with new identifiers as they are added to the network. Additionally, each access switch from the first group of access switches and the second group of access switches can be authenticated with the root control plane processor and provided with new identifiers as they are added to the network. Thus, the system can self-configure a secure (or authenticated) network. Such a system can be particularly advantageous, for example, in a data center environment in which hundreds or thousands of control plane processors, switch fabric portions, access switches, and/or other network devices are included.

FIG. 1 is a schematic illustration of a switch fabric system 100, according to an embodiment. Switch fabric system 100 includes access switches 110, first cables 150, second cables 160, a third cable 122, a fourth cable 124, a switch fabric 180, and a control plane processor 120. The switch fabric 180 includes a first switch fabric portion 130 and a second switch fabric portion 140. The switch fabric portions 130, 140 are configured to allow a first access switch 110 to send data to a second access switch 110. In some embodiments, for example, each switch fabric portion 130, 140 can include a number of switch modules configured to route data between two separate access switches.

In some embodiments, each switch module is a cell switch. The cell switches are configured to redirect cells (e.g., portions of data packets) as they flow through a data plane of the switch fabric. In some embodiments, for example, each cell switch includes multiple input ports operatively coupled to write interfaces on a memory buffer. Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell per time period and all output ports to read one outgoing cell per time period. In other embodiments, all input ports write one cell indicator (e.g., a pointer to a cell stored in a separate memory portion) per time period and all output ports read one cell indicator per time period. Each cell switch operates similar to a crossbar switch that can be reconfigured in each subsequent time period.

In alternate embodiments, each switch module is a crossbar switch having input bars and output bars. Multiple switches within the crossbar switch connect each input bar with each output bar. When a switch within the crossbar switch is in an "on" position, the input is operatively coupled to the output and data can flow within the data plane. Alternatively, when a switch within the crossbar switch is in an "off" position, the input is not operatively coupled to the output and data cannot flow. Thus, the switches within the crossbar switch control which input bars are operatively coupled to which output bars.

In some embodiments, the switch fabric 180 can be similar to the switch fabrics shown and described in U.S. patent application Ser. No. 12/345,500, filed on Dec. 29, 2008, and entitled "System Architecture for Highly Scalable and Distributed Multi-Stage Switch Fabric;" U.S. patent application Ser. No. 12/345,502, filed on Dec. 29, 2008, and entitled "Methods and Apparatus related to a Modular Switch Architecture;" and U.S. patent application Ser. No. 12/345,498, filed on Dec. 29, 2008, and entitled "Control Plane Architecture for Switch Fabrics;" all of which are incorporated herein by reference in their entireties. In some embodiments, for example, the switch fabric 180 can be a rearrangeably non-blocking Clos network such as a Benes network. In other embodiments, the switch fabric can be a strictly non-blocking Clos network. In still other embodiments, the switch fabric can be any switch fabric configured to route data from a first access switch to a second access switch.

The switch fabric portions 130, 140 can have any number of stages and/or switches to route data from a first access switch to a second access switch within the data plane. In some embodiments, for example, each switch fabric portion 130, 140 has three stages including multiple switch modules in each stage. In other embodiments, each switch fabric portion has five stages including multiple switch modules in each stage.

In some embodiments, each switch fabric portion 130, 140 of the switch fabric 180 can operate as a stand-alone switch fabric. Having two switch fabric portions 130, 140 that can operate as stand-alone switch fabrics allows the first switch fabric portion 130 to operate as a primary switch fabric and the second switch fabric portion 140 to be used for redundancy. Thus, if the first switch fabric portion 130 fails to operate, data will not be lost because the second switch fabric portion 140 will continue to operate. In other embodiments, the second switch fabric portion is used to increase the number of possible data paths between two access switches within the data plane. This can decrease the congestion within the switch fabric portions. In such embodiments, the switch fabric portions operate together to form a larger switch fabric operating as a single logical entity.

The access switches 110 are configured to send data to and receive data from the switch fabric 180 (including the first switch fabric portion 130 and the second switch fabric portion 140). Each access switch 110 can include a processor, a memory buffer, switch modules and/or any other components to assist in sending data to and receiving data from the switch fabric 180.

In some embodiments, the access switches 110 are configured to perform operations on a data packet before it is sent to the switch fabric 180. In some embodiments, for example, data packet parsing, data packet classification, and/or data packet forwarding occur at the access switches 110. In some embodiments, data buffering and switch fabric flow control also occur at the access switches 110. In such embodiments, the access switches 110 prepare the data packet to enter the switch fabric 180.

Figure 2:
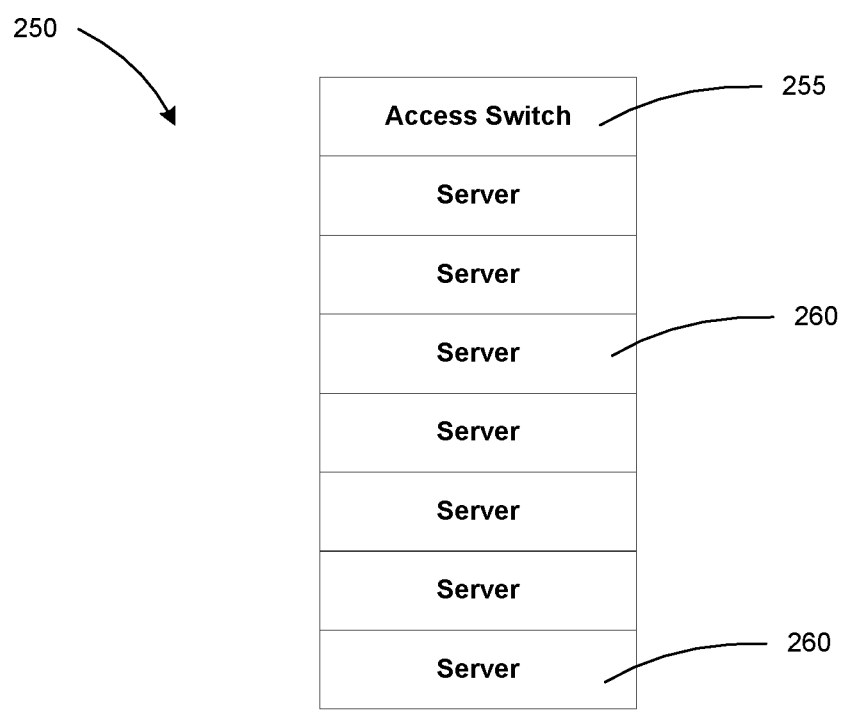
FIG. 2 is a schematic illustration of a chassis, according to another embodiment.

In some embodiments, each access switch 110 of the switch fabric system 100 can be physically located with and/or within a chassis. The chassis can be similar to the chassis 250 illustrated in FIG. 2. Chassis 250 includes an access switch 255 and multiple servers 260 (not shown in FIG. 1). Each server 260 is electrically coupled to the access switch 255 via a backplane connection (not shown). Each server 260 is configured to send data to and receive data from the access switch 255. In other embodiments, each server can be electrically coupled to the access switch in any manner. For example, in some embodiments, a midplane, multiple cables, a wireless connection and/or the like can be used to couple the servers 260 to the access switch 255. In other embodiments, various types of devices can be electrically coupled to the access switch. For example, storage devices, servers, workstations, and/or the like can be electrically coupled to the access switch. While chassis 250 is shown being associated with a single access switch 255, in other embodiments, the chassis can contain multiple access switches.

In some embodiments, the access switch can be in a different chassis than the servers. In some embodiments, for example, the access switch can be a one rack unit (1U) device within a first chassis. Each server can be a 1U, 2U, 4U, and/or any size server within a second chassis. In other embodiments, each server can be a blade server. The servers within the second chassis can be operatively coupled to the access switch within the first chassis by multiple cables. In some embodiments, for example, the cables operatively coupling the servers with the access switch can be 10 Gigabit Ethernet lines implemented using twin-ax copper cables and/or optical transceivers with a fiber pair for each cable. In other embodiments, the cables can be 1 Gigabit Ethernet lines. In still other embodiments, the cables can be any Ethernet line or any other communication connection according to a suitable protocol.

Returning to FIG. 1, each access switch 110 is coupled to the first switch fabric portion 130 of the switch fabric 180 by a first cable 150. In such an embodiment, the first switch fabric portion 130 is physically located within a different chassis than the access switch 110. Each first cable 150 can be any cable configured to carry a signal. In some embodiments, for example, the first cables 150 can be 10 Gigabit Ethernet lines. In other embodiments, the first cables can be 1 Gigabit Ethernet lines. In still other embodiments, the first cables can be any Ethernet line or any other communication connection according to a suitable protocol. In alternate embodiments, the first switch fabric portion is physically located within the same chassis as an access switch. In such embodiments, a backplane connection, a midplane, and/or the like can be used to couple the access switch to the first switch fabric portion.

In some embodiments, each first cable 150 includes multiple strands. The strands of the first cable 150 can be constructed of any material configured to carry a signal. In some embodiments, for example, the strands are optical fibers configured to carry an optical signal. In other embodiments, the strands are electrical conductors, such as copper, configured to carry an electrical signal.

Each access switch 110 is configured to send signals to and/or receive signals from the first switch fabric portion 130 via the first cables 150. For example, the first cable 150 can be configured to carry data signals and/or control signals between the access switch 110 and the first switch fabric portion 130. Data signals can include data packets configured to be sent from a first access switch 110 to a second access switch 110 via the switch fabric 180. Control signals can include any signal configured to control and/or monitor the switch fabric system 100. In some embodiments, for example, a control signal can include handshaking signals, packet-forwarding information, routing protocols, bridging protocols, error recovery information, routing tables, switch tables, topology-discovery signals, and/or the like. In some embodiments, data signals are transmitted within the data plane as cells in a cell-based network, and control signals are transmitted within the control plane as control data packets in an IP-based network.

In some embodiments, for example, each first cable 150 includes twelve strands. In such embodiments, the switch fabric system 100 can use eleven of the twelve strands of each first cable 150 to send data signals between an access switch 110 and the first switch fabric portion 130. Such strands can be referred to as part of the data plane of the switch fabric system 100. The remaining strand of each first cable 150 can be used to send control signals between the access switch 110 and the first switch fabric portion 130. Such a strand can be referred to as part of the control plane of the switch fabric system 100. In other embodiments, each first cable can include any number of strands. In yet other embodiments, each first cable can dedicate any number of strands to the data plane and/or the control plane of the system. In still other embodiments, the control signals and the data signals can be carried by the same strand. For example, the control signals can be multiplexed with the data signals, for example, time multiplexed so that the control signals can be sent and received at times when the data signals are not being sent and received.

When a first cable 150 is connected between an access switch 110 and the first switch fabric portion 130, both the control plane connection between that access switch 110 and the first switch fabric portion 130 and the data plane connection between that access switch 110 and the first switch fabric portion 130 are operative or present such that control signals and data signals can be transmitted within the control plane and data plane, respectively. Similarly, when the first cable 150 is not connected between an access switch 110 and the first switch fabric portion 130, both the control plane connection between that access switch 110 and the first switch fabric portion 130 and the data plane connection between that access switch 110 and the first switch fabric portion 130 are not present. Thus, when the data plane connection is present, so is the control plane connection, and vice versa. Thus, the control plane connection is available for use in controlling data flow when the data plane connection is present. In some embodiments, the control plane connection and the data plane connection can be separately formed with (or operatively coupled to) a switch fabric portion. In other words, a first cable can include connections for a data plane and a second cable can include connections for a data plane.

Each access switch 110 is coupled to the second switch fabric portion 140 of the switch fabric 180 by a second cable 160. Each second cable 160 can be any cable configured to carry a signal. In some embodiments, for example, the second cables 160 are structurally similar to the first cables 150.

In some embodiments, the second switch fabric portion 140 is within a chassis different than the chassis for the first switch fabric portion 130 and the chassis for the access switches 110. In other embodiments, the access switches, the first switch fabric portion, and/or the second switch fabric portion are physically located within a single chassis. In such embodiments, a backplane connector, a midplane, and/or the like can be used to couple the access switches to the second switch fabric portion.

Each access switch 110 is configured to send signals to and receive signals from the second switch fabric portion 140 via the second cables 160. For example, the second cable 160 can be configured to carry data signals and/or control signals between the access switches 110 and the second switch fabric portion 140. In some embodiments, for example, each second cable 160 includes twelve strands. In such an embodiment, the switch fabric system 100 can use eleven of the twelve strands of each second cable 160 to send data signals between an access switch 110 and the second switch fabric portion 140. Such strands can be referred to as part of the data plane of the switch fabric system 100. The remaining strand of each second cable 160 can be used to send control signals between the access switch 110 and the second switch fabric portion 140. Such a strand can be referred to as part of the control plane of the switch fabric system 100. In other embodiments, each second cable can include any number of strands. In yet other embodiments, each second cable can dedicate any number of strands to the data plane and/or the control plane of the system. In still other embodiments, the control signals and the data signals can be carried by the same strand. For example, the control signals can be multiplexed with the data signals, for example, time multiplexed so that the control signals can be sent and received at times when the data signals are not being sent and received.

When a second cable 160 is connected between an access switch 110 and the second switch fabric portion 140, both the control plane connection between that access switch 110 and the second switch fabric portion 140 and the data plane connection between that access switch 110 and the second switch fabric portion 140 are present. Similarly, when a second cable 160 is not connected between an access switch 110 and the second switch fabric portion 140, both the control plane connection between that access switch 110 and the second switch fabric portion 140 and the data plane connection between that access switch 110 and the second switch fabric portion 140 are not present. Thus, when the data plane connection is connected, so is the control plane connection, and vice versa. Thus, the control plane connection is available for use in controlling data flow when the data plane connection is present. In some embodiments, the control plane connection and the data plane connection can be separately present (or operatively coupled) to a switch fabric portion. In other words, a first cable can include connections for a data plane and a second cable can include connections for a data plane.

Having control plane strands and data plane strands in a single cable reduces the amount of cabling. Instead of using two separate cables (a cable for the data plane connections and a cable for the control plane connections), a single cable can be used for both the control plane connection and the data plane connection. Further, having a single cable with both a control plane connection and a data plane connection, allows the switch fabric system 100 to determine a data plane topology (e.g., the various connections within the data plane) based on a control plane topology (e.g., the various connections within the control plane). Said another way, when the switch fabric system 100 determines a control plane topology, because the data plane connections run parallel to the control plane connections (e.g., in the same cables), the switch fabric system 100 also determines a data plane topology. Said yet another way, because the control plane connections are connected to the same access switches as the data plane connections, once control plane connections are identified, data plane connections are also known. In other embodiments, a control plane topology can be determined from a data plane topology, in a similar manner.

The first switch fabric portion 130 is electrically and physically coupled to the control plane processor 120 by the third cable 122. Similarly, the second switch fabric portion 140 is electrically and physically coupled to the control plane processor 120 by the fourth cable 124. The fourth cable 124 is structurally and functionally similar to the third cable 122 and is therefore, not described in detail herein.

The third cable 122 can be any cable configured to carry a signal. In some embodiments, for example, the third cable 122 can be a 10 Gigabit Ethernet line. In other embodiments, the third cable 122 can be a 1 Gigabit Ethernet line. In still other embodiments, the third cable 122 can be any Ethernet line configured to carry a signal or any other communication connection according to a suitable protocol.

In some embodiments, the third cable 122 includes multiple strands. The strands of the third cable 122 can be constructed of any material configured to carry a signal. In some embodiments, for example, the strands are optical fibers configured to carry an optical signal. In other embodiments, the strands are electrical conductors, such as copper, configured to carry an electrical signal. In other embodiments, the third cable can include a single strand configured to carry a signal.

The third cable 122 is configured to carry control signals between the first switch fabric portion 130 and the control plane processor 120. In other embodiments, the third cable can be configured to carry both data signals and control signals between the first switch fabric portion and the control plane processor. As discussed above, control signals can include any signal configured to control and/or monitor the switch fabric system 100. In some embodiments, for example, a control signal can include handshaking signals, packet-forwarding information, routing protocols, bridging protocols, error recovery information, routing tables, switch tables, topology-discovery signals, and/or the like.

The control plane processor 120 can be any processor configured to control the operation of a switch fabric system. In some embodiments, for example, the control plane processor 120 can include a processor configured to control the operation of the switch fabric system and/or a memory configured to store information necessary to control the operation of the switch fabric system 100. In some embodiments, for example, the control plane processor can be a generic high performance server. While switch fabric system 100 is shown as having a single control plane processor 120, any number of control plane processors can be used to control a switch fabric system, as described in further detail herein.

In some embodiments, the control plane processor 120 is physically located within a chassis different from the chassis for the first switch fabric portion 130, the chassis for the second switch fabric portion 140, and the chassis for the access switches 110. In other embodiments, the control plane processor, the access switches, the first switch fabric portion, and/or the second switch fabric portion are within a single chassis. In such an embodiment, a backplane connector, a midplane, and/or the like can be used to couple the control plane processor to the first switch fabric portion, the access switches, and/or the second switch fabric portion.

The control plane processor 120 can store any control data and/or execute any control protocol configured to monitor and/or control the operation of the switch fabric system 100. In some embodiments, for example, the control plane processor 120 can run topology-discovery protocols to discover a control plane topology and/or a data plane topology of the switch fabric system 100. In some embodiments, the control plane processor can determine and/or distribute packet-forwarding (or cell-forwarding) information such as a routing table, a mapping of the system, a switch table, and/or the like. Such packet-forwarding (or cell-forwarding) information can then be distributed to the various modules within the switch fabric 180 and/or the access switches 110. In other embodiments, the control plane processor can control error recovery of switch fabric system 100. In some embodiments, error recovery can recognize when a data connection is inoperable and/or a data packet has not been correctly forwarded through switch fabric system 100.

In use, the control plane processor 120 can run a control-plane-discovery protocol to determine the configuration of the control plane of the switch fabric system 100. Because the data plane topology is parallel to the control plane topology, the control plane processor 120 determines the configuration of the data plane of the switch fabric system 100 from the control-plane-discovery protocol.

In some embodiments, control plane processor 120 (also referred to as a network management module) can define a control plane topology as network devices (e.g., access switches, switch fabric portions, switch modules, other control plane processors) are added to switch fabric system 100. In some embodiments, control plane processor 120 can authenticate a network device as part of a control-plane-discovery protocol. In some embodiments, after switch fabric portion 130 is connected to control plane processor 120 via cable 122, switch fabric portion 130 sends a key and an identifier to control plane processor 120. In some embodiments, the identifier is uniquely associated with switch fabric portion 130 within switch fabric system 100. Said differently, the identifier uniquely identifies switch fabric portion 130 among the network devices within switch fabric system 100. In some embodiments, the identifier is a device identifier such as a medium access control ("MAC") address. In some embodiments, a key can be a device-specific key. For example, the key can be a hash value based on the identifier and a password or passcode. In some embodiments, the key can be a digital certificate that has been signed by a trusted third party and issued to switch fabric portion 130.

Control plane processor 120 can receive the identifier and key, and can authenticate switch fabric portion 130. In other words, in some embodiments, control plane processor 120 can allow switch fabric portion 130 to join or access switch fabric system 100 if control plane processor 120 can validate switch fabric portion 130, or verify that switch fabric portion 130 is permitted to access switch fabric system 100. For example, control plane processor 120 can receive the identifier and the key, and generate a local version of the key at control plane processor 120 based on the identifier and a password or passcode. If the local version of the key matches (e.g., is identical to) the key sent by switch fabric portion 130, control plane processor 120 can authenticate switch fabric portion 130. In some embodiments, the key is a digital certificate and control plane processor 120 can validate the digital certificate with a third party after receiving the digital certificate from switch fabric portion 130. If the digital certificate is validated by the third party, control plane processor 120 can authenticate switch fabric portion 130. In some embodiments, if control plane processor 120 is unable to authenticate switch fabric portion 130 (e.g., the local and received keys do not match, or a digital certificate cannot be validated), control plane processor 120 can provide an error signal to switch fabric portion 130 to alert switch fabric portion 130 that an error has occurred, and that control plane processor 120 will not provide provisioning parameters to switch fabric portion 130.

Figure 3:
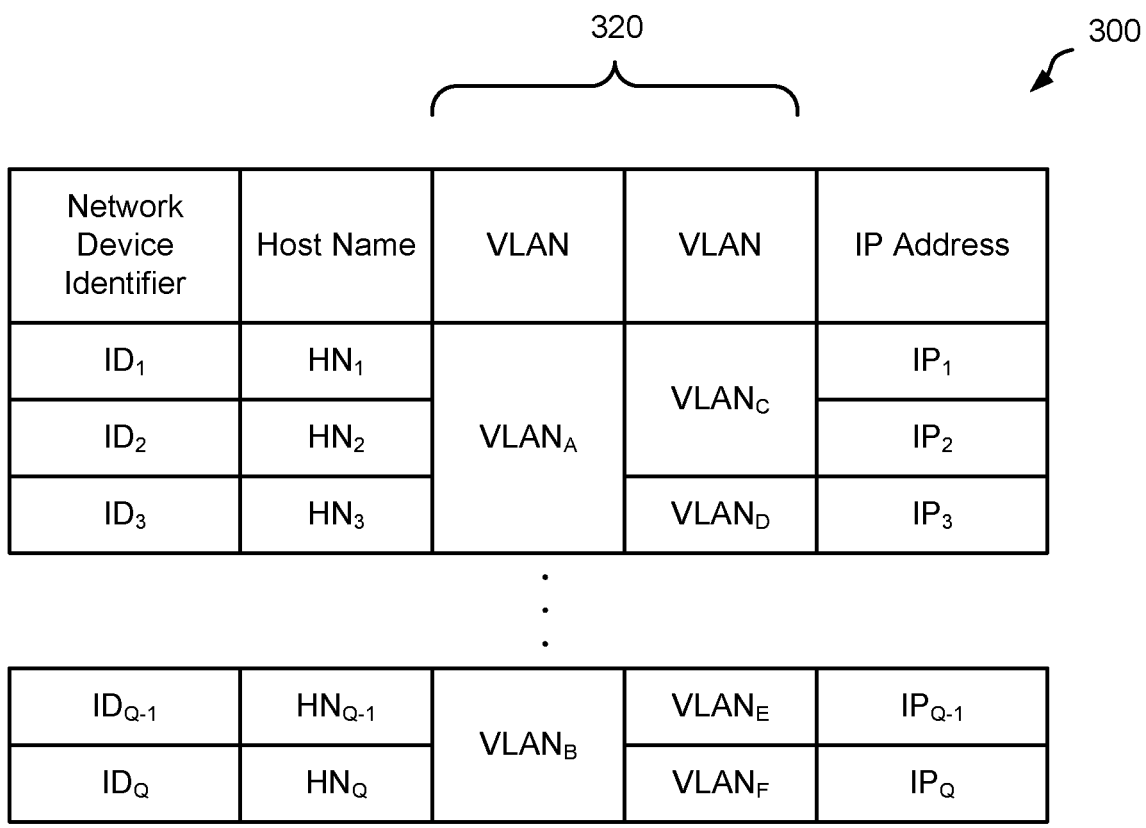
FIG. 3 is an illustration of a configuration table, according to an embodiment.

In some embodiments, after switch fabric portion 130 has been authenticated at control plane processor 120, control plane processor 120 can configure or provision switch fabric portion 130 for joining (or participating in) a control plane of switch fabric system 100. In some embodiments, control plane processor 130 includes (or has access to) a table or database including provisioning information for network devices. FIG. 3 is an illustration of a configuration table, according to an embodiment. As illustrated in FIG. 3, configuration table 300 includes a number of columns including provisioning information for network devices. For example, configuration table 300 includes the following columns: network device identifier, host name, virtual local area network ("VLAN"), and internet protocol ("IP") address. In some embodiments, configuration table 300 can include additional provisioning information such as port configurations, access control lists ("ACLs"), and/or port permissions.

In some embodiments, the network device identifier column includes identifiers of network devices for which configuration table 300 has provisioning information, and is used by control plane processor 120 to locate provisioning information for a particular network device. For example, control plane processor 120 can receive an identifier and look up (or select) a VLAN from configuration table 300 by accessing a VLAN in the row of configuration table 300 including the identifier. In other words, provisioning information can be accessed based on the identifier. More specifically, for example, a network device with network device identifier $ID_1$ can be provisioned with host name $HN_1$, VLANs $VLAN_A$ and $VLAN_C$, and IP address $IP_1$. Similarly, a network device with network device identifier $ID_Q$ can be provisioned with host name $HN_Q$, VLANs $VLAN_B$ and $VLAN_F$, and IP address $IP_Q$. In some embodiments, configuration table 300 can include default provisioning parameters that can be provided to network devices with an identifier not included in the network device identifier column of configuration table 300.

As illustrated in FIG. 3, a network device can be associated with more than one VLAN. For example, VLAN column 320 includes two VLAN columns. Thus, a network device can be associated with more than one VLAN within a control plane. In some embodiments, one subset of ports of a network device can be associated with one VLAN and another subset of ports of the network device can be associated with another VLAN. In some embodiments, configuration table 300 can include additional information (e.g., columns) for each network device identifier to indicate which ports of a network device are associated with each VLAN.

In some embodiments, an identifier provided by a network device to control plane processor 120 includes a host name. Thus, in some embodiments, the host name column can be used with, or in place of, the network device identifier to select provisioning information for a particular network device.

Referring now to FIG. 1, after control plane processor 120 has determined provisioning information (or parameters) for switch fabric portion 130, control plane processor 120 can send the provisioning parameters to switch fabric portion 130 via cable 122. In some embodiments, control plane processor 120 first sends an IP address to switch fabric portion 130, and switch fabric portion 130 designates that IP address as a communication identifier for switch fabric portion 130. In other words, switch fabric portion 130 will identify itself using the IP address provided by control plane processor 120, rather than the identifier provided to control plane processor 120. Control plane processor 120 then sends the remaining provisioning parameters (e.g., VLANs, host name, ACLs) to switch fabric portion 130, and switch fabric portion 130 provisions itself based on the provisioning parameters.

In some embodiments, after switch fabric portion 130 has been authenticated and/or provisioned, other switch fabric portions and/or access switches connected to switch fabric portion 130 can be authenticated and/or provisioned. For example, when an access switch 110 is connected to switch fabric portion 130, that access switch 110 can send an identifier and a key to switch fabric portion 130. Switch fabric portion 130 can forward the key and identifier to control plane processor 120. The access switch 110 can be authenticated at control plane processor 120, and switch fabric portion 130 can forward provisioning parameters from control plane processor 120 to the access switch.

In some embodiments, the network devices (e.g., access switches, switch fabric portions, control plane processors) are connected before switch fabric system 100 is powered on. When switch fabric system 100 is powered on, the network device can be authenticated and provisioned recursively. For example, control plane processor 120 can attempt to authenticate with another control plane processor. Because there is no other control plane processor within the control plane of switch fabric system 100, control plane processor 120 will receive no response to the sent identifier and key, and can determine that it is a root control plane processor for the control plane. In some embodiments, a root control plane processor is the control plane processor responsible for authenticating and provisioning network devices within the control plane. In other words, the other control plane processors within the control plane forward identifiers, keys, and other authentication communication (or traffic) to the root control plane processor.

In some embodiments, switch fabric system 100 does not include a single root control plane processor. Rather, multiple control plane processors can be responsible for authenticating and provisioning network devices within the control plane. Said differently, authentication and provisioning can be distributed across or among two or more control plane processors. For example, one control plane processor can authenticate and provision a first group of network devices within the control plane, and another control plane processor can authenticate and provision a second group of network devices within the control plane. In some embodiments, the first group of network devices can be included in one VLAN of the control plane and the second group of network devices can be included in another VLAN of the control plane.

After control plane processor 120 has determined that it is the root control plane processor (or network management module) for the control plane, control plane processor 120 begins to respond to authentication communication from the network devices attached to it. Thus, control plane processor 120 receives identifiers and keys from switch fabric portions 130 and 140, and authenticates and provisions switch fabric portions 130 and 140 as discussed above. After switch fabric portions 130 and 140 have been authenticated and provisioned, switch fabric portions 130 and 140 respond to authentication traffic from the access switches 100. In other words, switch fabric portions 130 and 140 forward authentication traffic between control plane processor 120 and access switches 100 after switch fabric portions 130 and 140 have been authenticated and provisioned. This process can continue and expand for additional network devices such as, for example, additional control plane processors within a control plane.

In some embodiments, communications within a control plane related to authentication of network devices at control plane processor 120 are based on one protocol, and other communications within the control plane are based on another protocol. For example, communications within the control plane related to authentication of network devices at control plane processor 120 can be based on layer-2 of the Open Systems Interconnection Reference Model ("OSI model"), and other communications within the control plane can be based on layer-3 of the OSI model. Thus, the identifier sent from switch fabric portion 130 to control plane processor 120 can be a MAC address sent via a layer-2 protocol. Control plane processor 120 can provide the IP address to switch fabric portion 130 via the layer-2 protocol. After switch fabric portion 130 receives the IP address and is configured to communicate via the IP address, control plane processor 120 can communicate with switch fabric portion 130 via a layer-3 protocol. In other words, a network device can authenticate with and receive some provisioning parameters from a control plane processor using a first class (or type) of identifier (e.g., a MAC address) and first protocol, and can receive other control signals and provisioning parameters from a control plane processor using a second class (or type) of identifier (e.g., an IP address) and second protocol.

Once the control plane processor 120 has determined or defined the configuration (or topology) of the data plane and/or the control plane, a routing table can be defined. In other words, after the network devices within a control plane have been discovered, authenticated, and/or provisioned, control plane processor 120 can define one or more routing tables for the control plane. The routing table can include information relating to the routes a data packet (or cell) takes as it traverses the switch fabric. For example, the routing table can indicate to which module within a second stage of a switch fabric a particular data packet (or cell) should be sent from a module within a first stage of the switch fabric. In this manner, the routing table can be used to define, at least in part, the path or route of the data packet (or cell) through the switch fabric to its destination access switch.

Routing tables and other control signals can be sent using the IP addresses of the network devices in the control plane. In other words, the control signals can be transmitted through the network based on layer-3 protocols. Using layer-3 protocols, the control plane can be separated into segments (e.g., VLANs) such that different segments have different routing tables. Additionally, addressing routing tables to particular VLANs within the control plane can reduce unnecessary broadcast traffic by limiting broadcast domains within the control plane. Said differently, the control plane can function as an IP-based network configured by the root network management module (e.g., control plane processor 120).

Once a routing table has been defined, a copy of the routing table is sent via the third cable 122 and the fourth cable 124 to the first switch fabric portion 130 and the second switch fabric portion 140, respectively. Each switch fabric portion 130, 140 can store a copy of the routing table such that when data is sent through either of the switch fabric portions 130, 140, the switch fabric portions 130, 140 will appropriately forward the message to its destination access switch. In other embodiments, a copy of the routing table is also sent to the access switches.

In addition to executing discovery protocols, defining routing tables and distributing routing tables, as stated above, the control plane processor 120 can perform any function appropriate for the operation of the switch fabric system 100. In some embodiments, for example, the control plane processor 120 can handle errors and/or respond to network changes arising in the operation of the switch fabric system 100. For example, if a device (e.g., an access switch) within the switch fabric system 100 is disconnected, the control plane processor 120 can define a new routing table reflecting the new topology of the system (i.e., without the device) and send a copy of the new routing table to the other components (e.g., network devices) of the switch fabric system 100.

Figure 4:
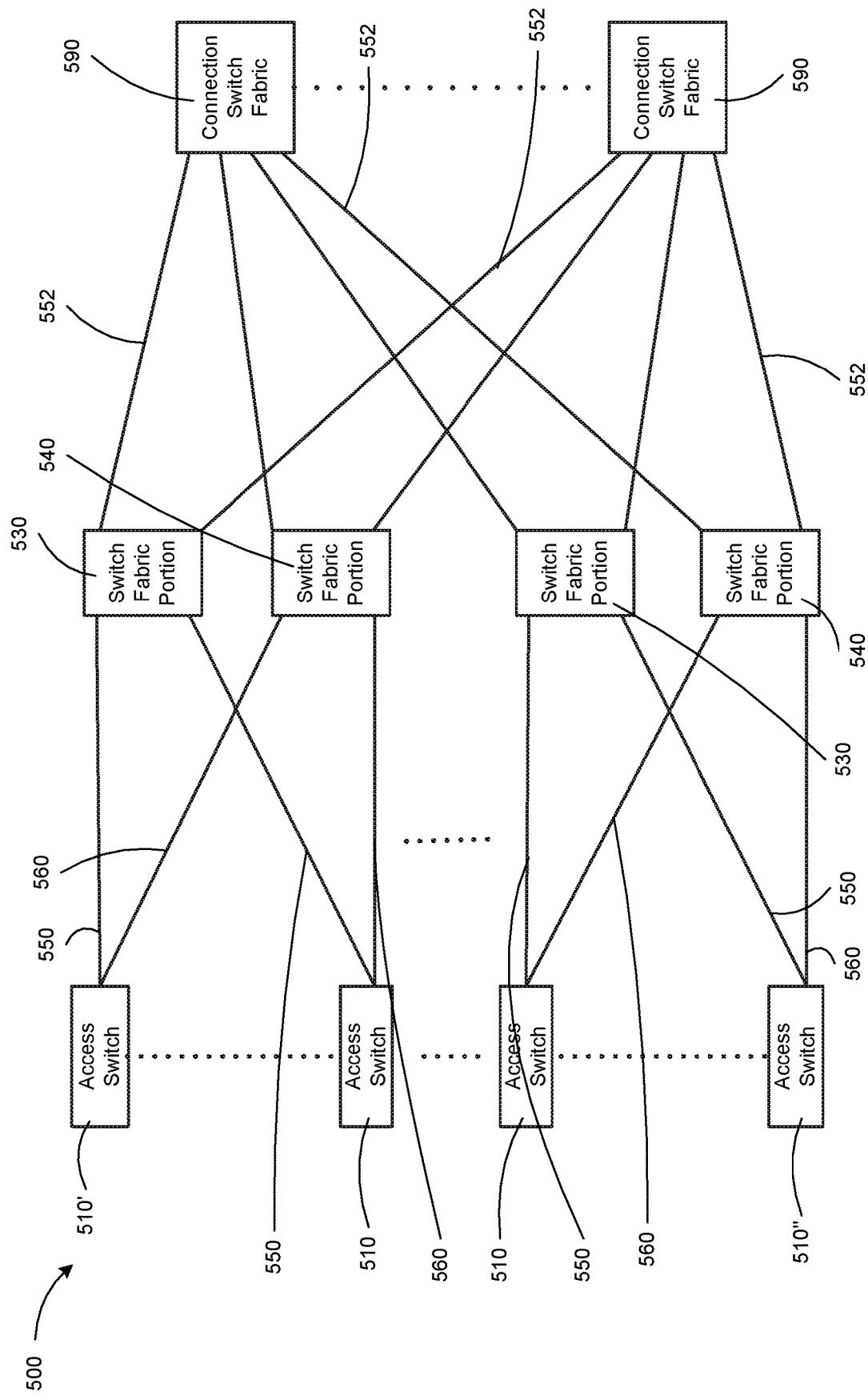
FIG. 4 is a schematic illustration of a portion of a data plane of a switch fabric system, according to another embodiment.
Figure 5:
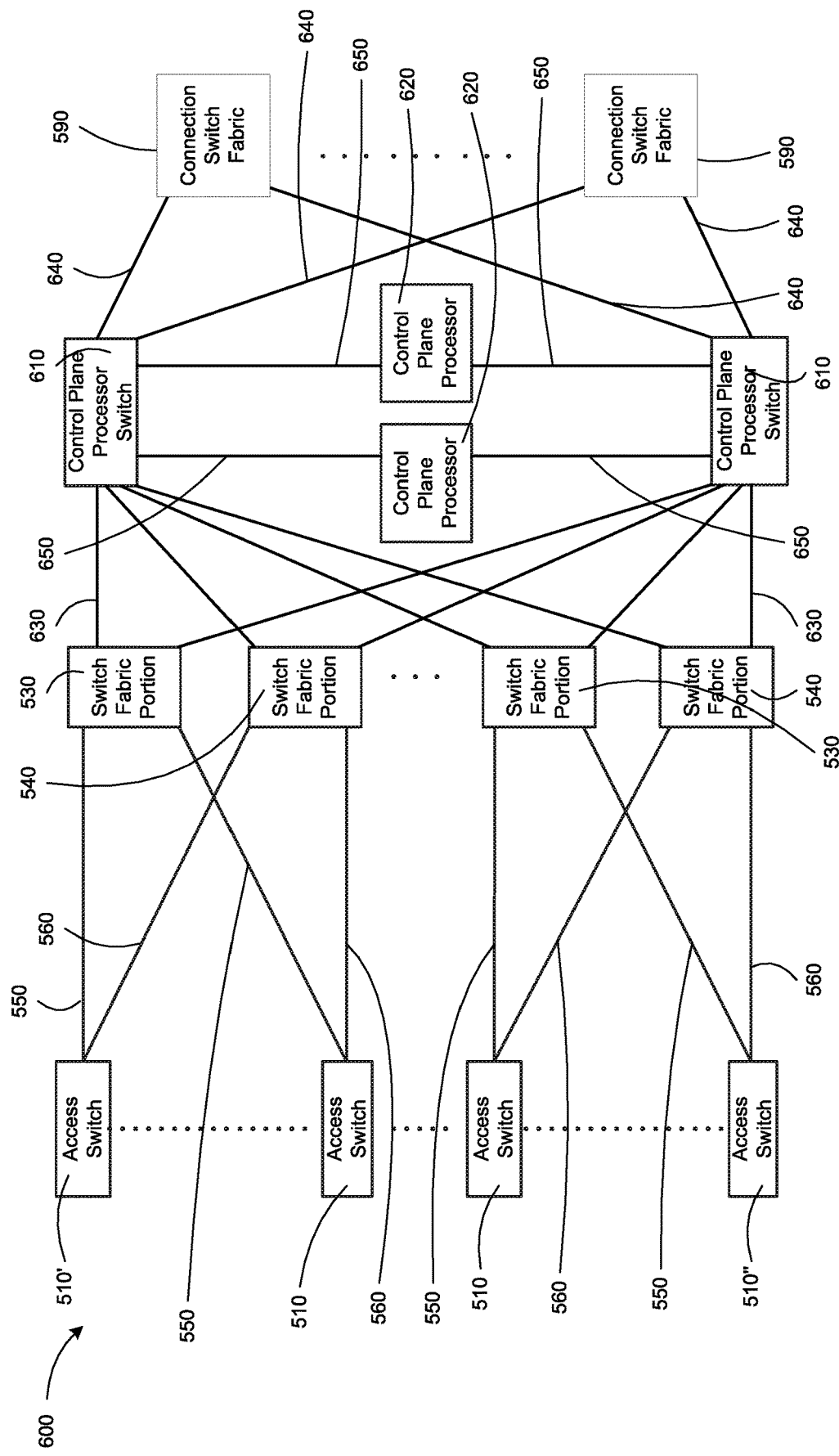
FIG. 5 is a schematic illustration of a portion of a control plane of the switch fabric system shown in FIG. 4.

FIGS. 4 and 5 show a portion of a data plane 500 of a switch fabric system and a portion of a control plane 600 of the switch fabric system, respectively, according to another embodiment. The data plane 500 of the switch fabric system includes multiple access switches 510, multiple first switch fabric portions 530, multiple second switch fabric portions 540, a first set of cables 550, a second set of cables 560, multiple connection switch fabrics 590, and a third set of cables 552. In some embodiments, the data plane 500 of the switch fabric system can be structurally and functionally similar to the switch fabrics shown and described in U.S. patent application Ser. No. 12/345,500, filed on Dec. 29, 2008, and entitled "System Architecture for Highly Scalable and Distributed Multi-Stage Switch Fabric;" U.S. patent application Ser. No. 12/345,502, filed on Dec. 29, 2008, and entitled "Methods and Apparatus related to a Modular Switch Architecture;" and U.S. patent application Ser. No. 12/345,498, filed on Dec. 29, 2008, and entitled "Control Plane Architecture for Switch Fabrics;" all of which are incorporated herein by reference in their entireties.

The access switches 510, the first set of cables 550 and the second set of cables 560 of the switch fabric system are structurally and functionally similar to the access switches 110, the first set of cables 150, and the second set of cables 160, respectively, described in connection with FIG. 1. Accordingly, the access switches 510 are configured to send signals to and receive signals from the first switch fabric portion 530 and the second switch fabric portion 540.

Each switch fabric portion 530, 540 is operatively coupled to each connection switch fabric 590 via the third set of cables 552. Thus, each switch fabric portion 530, 540 is operatively coupled to the other switch fabric portions 530, 540 via the connection switch fabrics 590. In some embodiments, the data plane 500 includes a five-stage switch fabric with the first stage and fifth stage of the switch fabric in the switch fabric portions 530, 540 and the second stage, the third stage and the fourth stage of the switch fabric in the connection switch fabrics 590.

The connection switch fabrics 590 can be structurally similar to the switch fabric portions 130, 140 described above. In some embodiments, for example, each connection switch fabric 590 includes multiple cell switches and/or crossbar switches configured to route data between switch fabric portions 530, 540.

In some embodiments, each cable of the third set of cables 552 includes multiple strands. The strands of each cable of the third set of cables 552 can be constructed of any material suitable to transfer data between the switch fabric portions 530, 540 and the connection switch fabrics 590. In some embodiments, for example, each cable 552 is constructed of multiple optical fibers configured to carry an optical signal. In other embodiments, the strands are electrical conductors, such as copper, configured to carry an electrical signal.

In some embodiments, each cable 552 can have thirty-six transmit and thirty-six receive strands. The thirty-six transmit strands of each cable 552 can include thirty-two strands for transmitting data, and four strands for expanding the data capacity and/or for redundancy. Similarly, the thirty-six receive strands of each cable 552 have thirty-two strands for transmitting data, and four strands for expanding the data capacity and/or for redundancy. In other embodiments, any number of strands can be contained within each cable.

As shown in FIG. 5, the control plane 600 of the switch fabric system includes the access switches 510, the switch fabric portions 530, 540, the first set of cables 550, the second set of cables 560, the connection switch fabrics 590, control plane processors 620, control plane processor switches 610, a fourth set of cables 630, a fifth set of cables 640, and a sixth set of cables 650. Each control plane processor 620 and each control plane processor switch 610 can be structurally and functionally similar to the control plane processor 384 and the control plane processor switch 382, respectively, discussed in connection with FIG. 3. As such, each control plane processor switch 610 is configured to forward control signals sent from a control plane processor 620 to another portion of the switch fabric system.

Multiple control plane processors 620 can each control a set of access switches and/or perform a different function. In some embodiments, a first control plane processor 620 is configured to control the routing of data originating from a first set of access switches configured to send data to a given switch fabric portion 530, 540, and a second control plane processor 620 is configured to control the routing of data originating from a second set of access switches configured to send data to another switch fabric portion 530, 540. In such embodiments, each control plane processor 620 controls a set of access switches based on their physical location in the switch fabric system.

In other embodiments, each control plane processor does not have information on the physical location (i.e., location within the network topology) of the access switches (or other network devices) it controls. In such embodiments, a first control plane processor is configured to control the routing of data originating from a group of access switches from a first set of access switches to a given switch fabric portion, and the routing of data originating from a group of access switches from a second set of access switches to another switch fabric portion. A second control plane processor is configured to control the routing of data originating from the other access switches from the first set of access switches and the routing of data originating from the other access switches from the second set of access switches. If the physical location of an access switch changes, the same control plane processor can control the routing of data from that access switch. In this manner, each control plane processor can control the same access switches regardless of the physical location of the access switches. For example, the access switches can each be associated with a first VLAN or a second VLAN, and the first and second control plane processors can be virtual root network management modules for the first and second VLANs, respectively. Thus, the access switches are associated logically with a root network management module based on a VLAN (or VLAN identifier) rather than physically based on, for example, a port or other physical connection.

In still other embodiments, each control plane processor can control each access switch for a separate purpose. In some embodiments, for example, a first control plane processor can be used to run topology protocols, and a second control plane processor can be used to distribute the routing tables to modules within the control plane of the switch fabric system. In other embodiments, a first control plane processor can be used to perform routing functions, and a second control plane processor can be used to handle error detection and recovery. In yet other embodiments, any control plane function can be performed by a first control plane processor and another control plane function can be performed by a second control plane processor.

In yet other embodiments, each control plane processor (or network management module) controls the routing of data based on the data itself. In some embodiments, for example, specific data stored on a server (or storage device) operatively coupled to an access switch (e.g., data pertaining to a certain company) can be controlled by a specific control plane processor regardless of the server on which it is stored and/or regardless to which access switch the server is operatively coupled. In such embodiments, if the data is moved between servers (or storage devices) within the system (e.g., to optimize the performance and/or or capacity of the system) the same control plane processor can control the data. Thus, the control plane processor controls the data regardless of which access switch the server containing the data is operatively coupled to and regardless of the server on which the data is stored.

In some embodiments, one control plane processor (or network management module) can be a root control plane processor (or root network management module) and another control plane processor can be a virtual root control plane processor (or virtual root network management module). The root control plane processor can authenticate and/or provision network devices as they are added (connected) to or are powered on within a control plane. In some embodiments, the root control plane processor can reauthenticate and/or reprovision a network device after the network device is physically moved (e.g., disconnected from one location and connected to another location) within the control plane. The virtual root control plane processor can define and/or update one or more routing tables for a VLAN, and can distribute the routing tables to the network devices associated with that VLAN. In other words, the virtual root control plane processor can manage a VLAN. In some embodiments, a virtual root control plane processor can manage multiple VLANs. Thus, the routing tables defined by that virtual root control plane processor designate or identify the virtual root control plane processor as a destination for information related to changes within the topology (e.g., network device disconnection notification and network device connection notifications) of the control plane.

In some embodiments, a root control plane processor can designate a control plane processor as a virtual root control plane processor. In some embodiments, the root control plane processor can designate a control plane processor as a virtual root control plane processor based on a configuration table at the root control plane processor. For example, the configuration table can include a flag or indicator associated with an identifier of the control plane processor indicating that the control plane processor should be provisioned as a virtual root control plane processor.

In some embodiments, a root control plane processor can provision a control plane processor as a virtual root control plane processor in response to changes in traffic within the control plane or within the data plane. For example, as more network devices are added to the control plane or network traffic within the data plane changes, the root control plane processor may not have sufficient processing capacity to meet the demands of the system, and the root control plane processor can designate a control plane processor as a virtual root control plane processor to offload management of a VLAN (or multiple VLANs) to that control plane processor. In some embodiments, a root control plane processor can define a VLAN (or multiple VLANs) to balance processing and network traffic demands within the control plane. For example, a root control plane processor can define a new VLAN and provision a subset of the network device within the control plane to join that VLAN. In some embodiments, the root control plane processor can send such provisioning instructions (or parameters) to network devices using IP addresses provisioned for those network devices. Then, the root control plane processor can designate a control plane processor as a virtual root control plane processor to offload management of that VLAN to that control plane processor.

Each control plane processor 620 is operatively coupled to control plane processor switches 610 by cables from the sixth set of cables 650. Each cable from the sixth set of cables 650 can be any cable capable of operatively coupling the control plane processor 620 with the control plane processor switch 610. In some embodiments, for example, each cable from the sixth set of cables 650 can be a 10 Gigabit Ethernet line. In other embodiments, each cable from the sixth set of cables 650 can be a 1 Gigabit Ethernet line. In still other embodiments, each cable from the sixth set of cables can be any Ethernet line or any other communication connection according to a suitable protocol.

In some embodiments, each cable from the sixth set of cables 650 includes multiple strands. The strands of each cable from the sixth set of cables 650 can be constructed of any material configured to carry a signal. In some embodiments, for example, the strands are optical fibers configured to carry an optical signal. In other embodiments, the strands are electrical conductors, such as copper, configured to carry an electrical signal. In some embodiments, each cable from the sixth set of cables 650 can include a single strand configured to carry a signal.

In other embodiments, each control plane processor can be operatively coupled to a control plane processor switch by another means, such as, for example, an electrical trace on a printed circuit board (PCB). In such embodiments, the control plane processor switch and the control plane processor can be within a single chip package, similar to the control plane processor switch 384 and the control plane processor switch 382, described above.

Each switch fabric portion 530, 540 is operatively coupled to each control plane processor switch 610 by a cable from the fourth set of cables 630. Each cable from the fourth set of cables 630 can be structurally similar to each cable from the sixth set of cables 650. Each cable from the fourth set of cables 630 is configured to send control signals to and receive control signals from the control plane processor switches 610.

Each connection switch fabric 590 is operatively coupled to each control plane processor switch 610 by a cable from the fifth set of cables 640. Each cable from the fifth set of cables 640 can be structurally similar to each cable from the sixth set of cables 650. Each cable from the fifth set of cables 640 is configured to send control signals to and receive control signals from the control plane processor switches 610.

In use, the control plane processors 620 can run a control-plane-topology protocol. The control-plane-topology protocol is used to determine the location of the components within the control plane of the switch fabric system. In some embodiments, for example, the control plane processors 620 send a discovery signal to a control card (not shown) co-located with each switch fabric portion 530, 540 and to a control card (not shown) co-located with each connection switch fabric 590. The control cards co-located with each switch fabric portion 530, 540 then send discovery signals to interface cards (not shown) associated with each switch fabric portion 530, 540. The interface cards then send discovery signals to each access switch 510 within the switch fabric system. Each access switch 510, interface card, control card associated with each switch fabric portion 530, 540 and control card associated with each connection switch fabric 590 can send a reply signal indicating its location within the switch fabric system to the control plane processors 620. Based on these reply signals, the control plane processors 620 can define a routing table that includes the location of each access switch 510, interface card, control card and/or other components within the switch fabric system. The control plane processors 620 can then distribute a copy of the routing table to each control card associated with each switch fabric portion 530, 540 and each control card associated with each connection switch fabric 590. In other embodiments, the control plane processors 620 also distribute the routing table to each interface card and/or to each access switch 510.

Each control card associated with the switch fabric portions 530, 540 and associated with the connection switch fabrics 590 can then control routing of data through the switch fabric. Based on the routing table, the control cards can determine to which module within the next stage of a switch fabric a module within a stage of the switch fabric should send the data. In some embodiments, each control card can control the routing for a given number of stages within the switch fabric.

Once the routing information is determined, data packets (or cells) can be sent from a first access switch 510 to a second access switch 510 through the data plane 500 of the switch fabric system. For example, access switch 510' can send a data packet (or cell) to access switch 510" through the data plane 500. The routing table can be used to determine to which switch fabric portion 530, 540 the access switch 510' should send the data packet (or cell). Once the data reaches the source switch fabric portion 530, 540, the routing table can be used to determine to which connection switch fabric 590 the switch fabric portion 530, 540 should send the data packet (or cell). Once the data packet (or cell) reaches the connection switch fabric 590, the routing table can be used to determine to which switch fabric portion 530, 540 and subsequently, to which access switch 510", the data packet (or cell) should be sent. In this manner, the data packet (or cell) is sent from the access switch 510' to the access switch 510".

In other embodiments, the first access switch sends a portion of the data to each switch fabric portion to which it is operatively coupled. In such embodiments, the routing information is not needed to send the data from the access switch to the switch fabric portion because every switch fabric portion coupled to the first access switch receives a portion of the data. Then, each switch fabric portion sends a portion of the data (e.g., cells) received by the switch fabric portion to each connection switch fabric. In such embodiments, the routing information is not needed to send the data from the switch fabric portions to the connection switch fabrics because every connection switch fabric receives a portion of the data. The routing data is then used to determine to which set of switch fabric portions the connection switch fabrics should send portions of the data packet (or cell). In such embodiments, the switch fabric portions then use the routing data to determine to which access switch (e.g., the second access switch) the portions of the data packet (e.g., cells) should be sent. In such embodiments, the second access switch then reassembles the data packet from the portions of the data packet (e.g., cells) received from each switch fabric portion.

If any portion of the switch fabric system fails to operate correctly and/or is removed from operation, a control plane processor 620 receives a notification and updates the routing table accordingly. For example, if a cable 550 is disconnected, the switch fabric portion 530, 540 sends a notification signal to the control plane processor 610. Based on the notification signal, the control plane processor 610 can remove the reference(s) to access switch 510 from the routing table. Similarly, if a component is added to the switch fabric system, a control plane processor 620 can receive a notification signal and add a reference(s) to the component to the routing table. For example, if an access switch 510 is added to the switch fabric system, the control plane processor 620 receives a notification signal, updates the routing table accordingly, and sends a copy of the updated routing table to the control processors associated with each switch fabric portion 530, 540. In other embodiments, the control plane processor can reroute data packets already within the data plane of the switch fabric when a data path fails to operate correctly. In this manner, the data packet can reach its destination via alternative paths.

In some embodiments, for example, the various components of the system can include optical sources and receivers. For example, if data is transferred between the access switch and the interface card via a cable having optical fibers, the access switch and the interface card can have an optical source, such as a vertical-cavity surface-emitting laser (VCSEL), that can convert an electrical signal used on the sending chip (e.g., the access switch or the interface card) into an optical signal to be sent via the cable to the receiving chip. Similarly, the access switch and the interface card can have an optical receiver configured to receive an optical signal and convert the optical signal into an electrical signal to be used on the receiving chip. In other embodiments, other components of the system, such as, for example, the control card and/or the control plane processor card, also include an optical source and/or an optical receiver.

While embodiments shown and described above as having one or two control plane processors, a switch fabric system can have any number of control plane processors according to the size of the workload of the system. For example, a switch fabric system with a respectively small workload (e.g., a small number of access switches and/or stages within the switch fabric) might have a single control plane processor while a system with a larger workload (e.g., a large number of access switches and/or stages within the switch fabric) might have multiple control plane processors. Additionally, if the workload of a system increases and/or decreases, the number of control plane processors in the switch fabric system can be increased and/or decreased, respectively.

In some embodiments, each control card can include multiple processors. In some embodiments, the multiple processors can be used to control various functions performed by the control card. For example, a first processor can control the routing of data and a second processor can control sending signals to a control plane processor to update the routing table. In other embodiments, the first control plane processor can control routing of data originating from a first set of access switches and the second control plane processor can control routing of data originating from a second set of access switches. In some embodiments, one processor can be configured as a virtual root control plane processor for one VLAN and another processor can be configured as a virtual root control plane processor for another VLAN.

In some embodiments, the access switches, the interface cards, the control cards and/or the control plane processor cards can be disposed within the same housing. In some embodiments, the components within the access switches, the interface cards, the control cards, and/or the control plane processor cards can be disposed within a single chip package. In such embodiments, cables are unnecessary.

Figure 6:
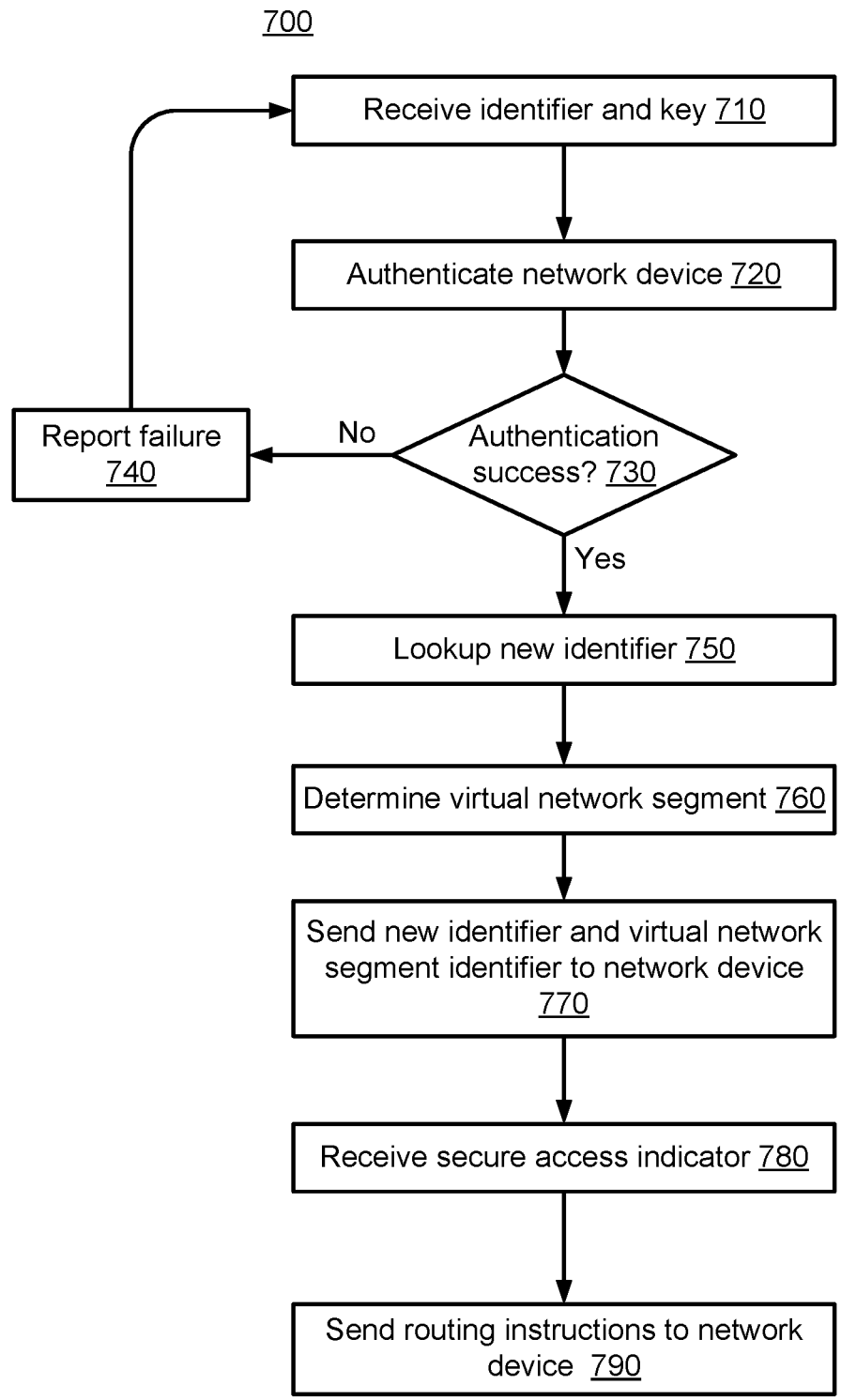
FIG. 6 is a block diagram of a process for adding a network device to a control plane of a data center switch fabric, according to an embodiment.

FIG. 6 is a block diagram of process 700 for adding a network device to a control plane of a data center switch fabric, according to an embodiment. In some embodiments, process 700 can be implemented at, for example, a control plane processor. For example, processor-executable instructions stored at a memory of a control plane processor can be executed at a processor at the control plane processor to cause the processor to execute the steps of process 700. As illustrated in FIG. 6, an identifier associated with a network device and a key are received, at 710. A key can be, for example, network device identity information such as a digital certificate related to a network device. In some embodiments, network device identity information (or a key or digital certificate) can include identifying information related to the network device such as, for example, a serial number, a software version, and/or a MAC address. The network device is authenticated, at 720, based on the key. For example, a digital certificate can be signed or authenticated by a third party and the network device can be authenticated based on the digital certificate. In some embodiments, a serial number, a software version, and/or a MAC address can be used to authenticate a network device. For example, a network device can be authenticate based on a serial number and/or a software version within a range of serial numbers and/or a range of software versions. In some embodiments, an ACL or other list can include authorized MAC addresses and a network device can be authenticated based on a MAC address. In some embodiments, the network device is authenticated based on the key and the identifier.

For example, a control plane processor implementing process 700 can receive the identifier and the key, and generate a local version of the key at the control plane processor based on the identifier and a password or passcode. The password or passcode can be, for example, an alpha-numeric- or bit-stream accessible to the network device and the control plane processor that is used to encrypt or encode the identifier. If the local version of the key matches (e.g., is identical to) the key sent by the network device, the control plane processor can authenticate the network device. In some embodiments, the key is a digital certificate and the control plane processor can validate the digital certificate with a third party after receiving the digital certificate from the network device. If the digital certificate is validated by the third party, the control plane processor can authenticate the network device. In some embodiments, other forms of authentication can be used.

If the authentication fails (that is, is not successful), at 730, the failure is reported to the network device, at 740. After the failure is reported, at 740, process 700 returns to step 710 to receive another identifier and key. For example, the network device may attempt to authenticate with a control plane processor with a different key, or another network device may be attempting to authenticate with the control plane processor.

If the authentication is successful, at 730, a new identifier for the network device is determined, at 750. In some embodiments, a control plane processor implementing process 700 can lookup a new identifier for the network device in a configuration table at the control plane processor based on, for example, the identifier received, at 710. In some embodiments, the control plane processor can dynamically determine the new identifier. For example, the new identifier can be the next identifier in a numeric sequence or can be a hash value based on the identifier received, at 710.

Additionally, in some embodiments, a virtual network segment is determined, at 760. In some embodiments, a control plane processor implementing process 700 can lookup a virtual network segment identifier such as a VLAN identifier for the network device in a configuration table at the control plane processor based on, for example, the identifier received, at 710. In some embodiments, multiple network segment identifiers for a single network device are included in the configuration table. In some embodiments, the control plane processor can dynamically determine the virtual network segment. For example, the virtual network segment can be determined based on processing or computational loads of other control plane processors, control traffic, and/or other parameters or conditions in a control plane. In some embodiments, the virtual network segment can be determined based on processing or computational loads of servers and/or access switches, data traffic, and/or other parameters or conditions in a data plane.

After the new identifier and virtual network segment identifier are determined, they can be sent to the network device, at 770. In some embodiments, a secure access indicator can be sent to the network device, at 780, to indicate that the network device has joined a secure network segment and/or that authentication was successful. In some embodiments, a network device can be provisioned even if authentication fails. For example, the determining whether authentication succeeded, at 730, can be omitted in some embodiments, and network devices failing authentication do not receive at secure access indicator, at 780. After the network device has been provisioned based on the new identifier and/or virtual network segment identifier, routing instructions and/or other configuration signals can be sent, at 790.

In some embodiments, process 700 includes more or fewer steps than illustrated in FIG. 6. For example, process 700 can include additional steps related to determining and/or sending provisioning information other than a new identifier and/or a virtual network segment identifier. For example, ACLs, port configurations, and/or other provisioning parameters can be determined and sent to a network device. In some embodiments, process 700 does not include authentication steps. In other words, in some embodiments, network devices are not authenticated before they are provisioned. In some embodiments, a control plane processor implementing process 700 can offload sending routing instructions and/or other configuration signals to another control plane processor within a control plane. For example, the control plane processor implementing process 700 can send the new identifier of the network device to the other control plane processor, and the other control plane processor can send routing instructions and/or other control signals to the network device based on the new identifier. In other words, the other control plane processor can address data packets to the network device using the new identifier.

Figure 7:
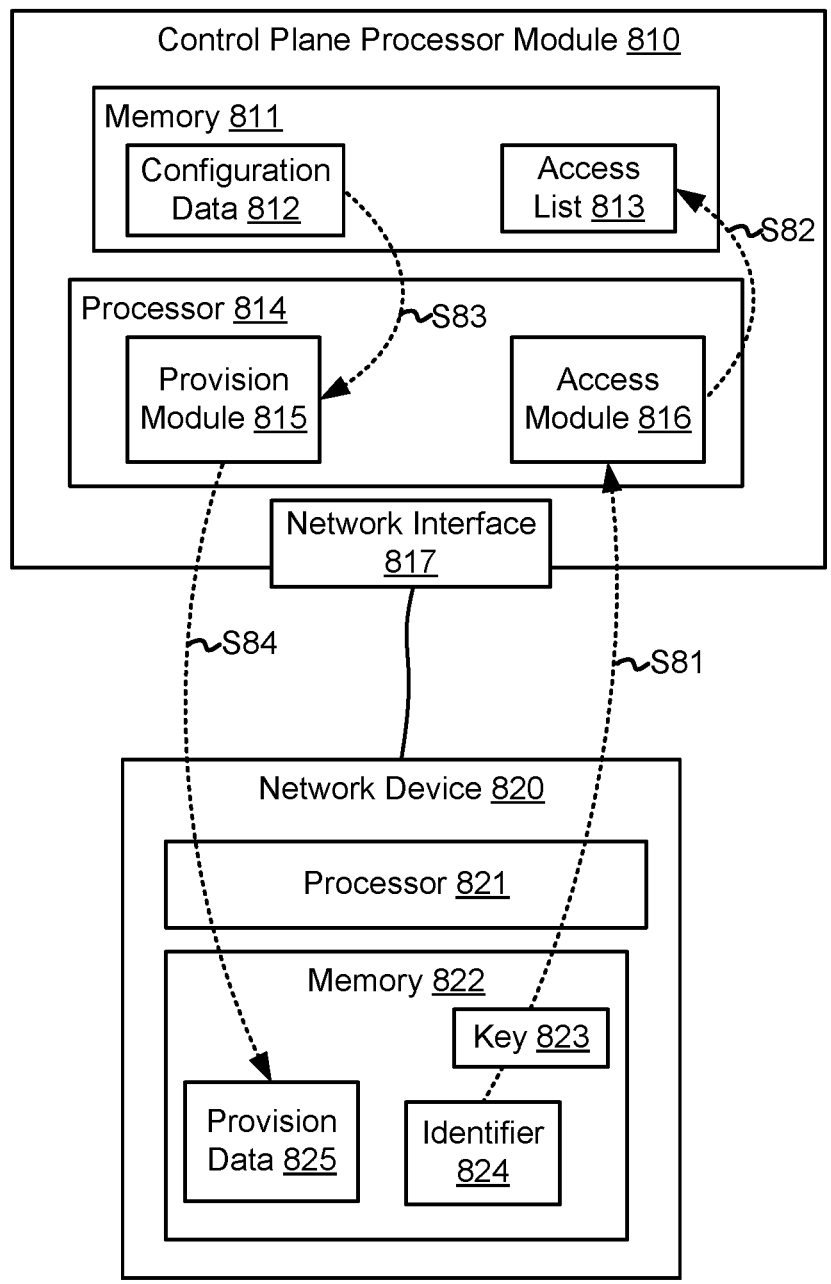
FIG. 7 is a system block diagram of a network device after it has been operatively coupled to a network management module, according to an embodiment.

FIG. 7 is a system block diagram of a network device after it has been operatively coupled to a control plane processor module, according to an embodiment. Network device 820 is operatively coupled to control plane processor module 810 via network interface 817 at control plane processor module 810. In some embodiments, network device 820 also includes a network interface (not shown). As illustrated in FIG. 7, control plane processor module 810 includes processor 814 and memory 811. Network device 820 includes processor 821 and memory 822.

In some embodiments, network device 820 can be configured to detect that it is operatively coupled or connected to control plane processor module 810. For example, network device 820 can detect that a connector such as a copper wire is grounded at network interface 817. In other embodiments, network device 820 can detect a clock, control, or data signal at a connector after network device 820 is connected to network interface 817 of control plane processor module 820. After detecting (or determining) that network device 820 is operatively coupled to control plane processor module 810, network device 820 can authenticate with control plane processor module 820 to receive provisioning parameters from control plane processor module 810 and join a control plane including control plane processor module 810.

In some embodiments, as illustrated by path S81, processor 821 is configured to access identifier 824 and key 823, and send identifier 824 and key 823 to control plane processor module 810 to authenticate with control plane processor module 820. Processor 814 can receive identifier 824 and key 823 at access module 816. Access module 816 can be configured to receive identifier 824 and key 823 and authenticate network device 820. In some embodiments, as illustrated by path S82, access module 816 can access memory 811 to determine whether identifier 824 is included in access list 813 including identifiers of network device authorized to receive provisioning parameters from control plane processor module 810 and/or join the control plane. In some embodiments, control plane processor module 810 can generate a local version of key 813 at control plane processor module 810 based on the identifier and a password or passcode. The password or passcode can be, for example, an alpha-numeric- or bit-stream accessible to network device 820 (e.g., stored at memory 822) and control plane processor module 810 that is used to encrypt or encode identifier 824 to define key 823. If the local version of key 823 matches (e.g., is identical to) key 823 sent by network device 820, control plane processor module 810 can authenticate network device 820. In some embodiments, key 823 is a digital certificate and control plane processor module 810 can validate the digital certificate with a third party after receiving the digital certificate from network device 820. If the digital certificate is validated by the third party, control plane processor module 810 can authenticate network device 820.

After access module 816 has authenticated network device 820, provision module 815 of processor 814 can access configuration data 812 (illustrated as path S83) and provide configuration or provisioning information such as, for example, provisioning parameters and/or instructions to network device 820 (illustrated as path S84). Network device 820 can receive the provisioning information, and processor 821 can store the provisioning information at memory 822 as provision data 825, as illustrated by path S84. Processor 821 can then access provisioning data 825 to provision network device 820. For example, provisioning data 825 can include an IP address and a VLAN identifier, and processor 821 can configure a network interface (not shown) of network device 820 to communicate with control plane processor module 820 (and other network devices and/or control plane processor modules within the control plane) based on that IP address and that VLAN identifier. In other words, network device 820 can assign itself the IP address provided by control plane processor module 810, and join the VLAN associated with a VLAN identifier provided by control plane processor module 810.

In some embodiments, network device 820 is authenticated and provisioned by control plane processor module 810 using one class (or type) of identifier and/or protocol, and receives control signals from control plane processor module 810 using a second class (or type) of identifier and/or protocol. For example, in some embodiments, identifier 824 is a MAC address of network device 820, and communication illustrated by paths S81 and S84 are layer-2 communications. In other words, network device 820 can authenticate with and receive provisioning parameters from control plane processor module 810 at the data link layer using physical addressing. Said differently, control plane processor module 810 can authenticate and provision (or provide provisioning instructions to) network device 820 based on a physical address or identifier of network device 820. After network device 820 is authenticated and provisioned with an IP address, control plane processor module (as discussed above) can provide control signals to network device 820 using layer-3 communications. In other words, control signals are transmitted through the control plane at the network layer using logical addressing. This allows the control plane to use logical abstractions and network segments such as, for example, VLANs, advanced routing protocols to distribute control signals in the control plane because network device can be identified logically rather than exclusively by a physical identifier.

Figure 8:
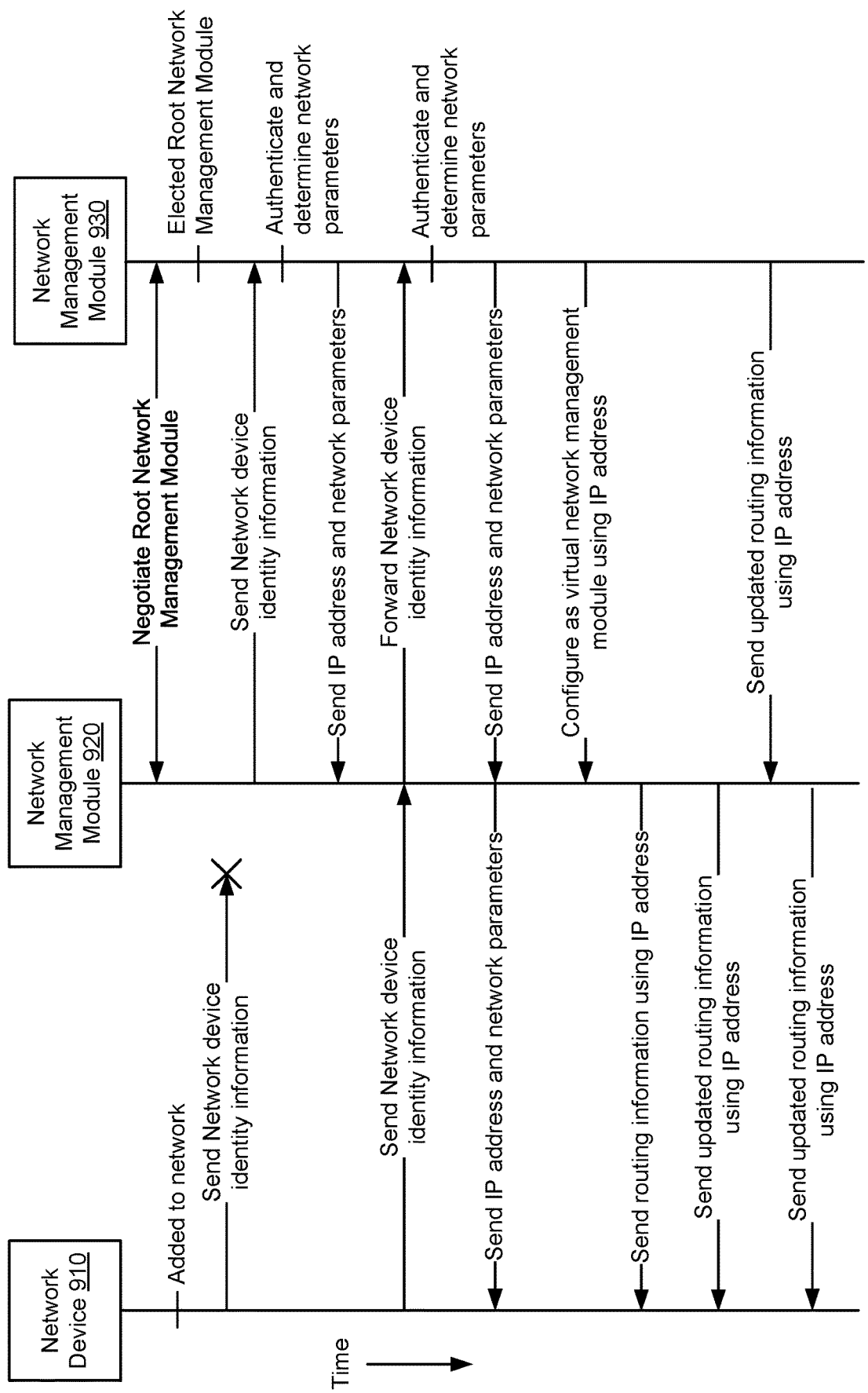
FIG. 8 is a signal flow diagram that illustrates signals transmitted within a control plane of a data center switch fabric during addition of devices to the control plane of a data center switch fabric, according to an embodiment.

FIG. 8 is a signal flow diagram that illustrates signals transmitted within a control plane of a data center switch fabric during addition of devices to the control plane of a data center switch fabric, according to an embodiment. As illustrated in FIG. 8, network management module 920 and network management module 930 negotiate to determine which will be the root network management module when they are first operatively coupled to the control plane. Negotiation can include comparing processing capabilities, memory sizes, software or firmware versions or revisions, uptime, and/or other properties or parameters of each of network management module 920 and network management module 930. Based on the negotiation, one of network management module 920 and network management module 930 is elected (or mutually selected) as the root network management module. As illustrated in FIG. 8, network management module 930 is elected as the root network management module for the control plane.

As illustrated in FIG. 8, during the negotiation (or election), network device 910 is connected (or added) to the control plane. Network device 910 attempts to authenticate with the root network management module by sending network device identity information to the root network management module, but receives no response because network management module 920 has not yet been authenticated and provisioned. Network device identity information (also referred to as a key) can include identifying information related to the network device such as, for example, a serial number, a software version, a MAC address and/or other information related to a network device. In some embodiments, network device identity information can include a digital certificate related to a network device. For example, a digital certificate including a serial number, a software version, a MAC address and/or other information related to a network device can be signed or authenticated by a third party and the network device can be authenticated based on the digital certificate. In some embodiments, network device identity information can include a key associated with access to a secure network segment. For example, the network device can be added to a secure network segment based on a key.

After network management module 930 is elected as the root network management module, network management module 920 sends network device identity information related to network management module 920 to network management module 930 (the root network management module), to authenticate with and be provisioned by network management module 930. Network management module 930 receives the network device identity information sent by network management module 920, authenticates network management module 920, and determines network parameters (or provisioning parameters) including an IP address for network management module 920. Network management module 930 then sends the IP address and network parameters to network management module 920.

Network management module 920 can designate the IP address as its communication identifier and provision ports and/or other properties of network management module 920 based on the network parameters provided by network management module 930. After network management module 920 has been authenticated and provisioned, it can forward the network device identity information sent by network device 910. As illustrated in FIG. 8, network device 910 sends network device identity information relate to network device 910 to network management module 930 (the root network management module) via network management module 920. In other words, network management module 920 can forward layer-2 control plane traffic within the control plane such that network device 910 and network management module 930 can communicate via layer-2 identifiers and protocols. Network management module 930 receives the network device identity information sent by network device 910, authenticates network device 910, and determines network parameters (or provisioning parameters) including an IP address for network device 910. Network management module 930 then sends the IP address and network parameters to network device 910 via network management module 920. That is, network management module 920 receives the IP address and network parameters from network management module 930, and forwards the IP address and network parameters to network device 910. Similar to network management module 920, network device 910 can designate the IP address as its communication identifier and provision ports and/or other properties of network device based on the network parameters provided by network management module 930. In some embodiments, after network device 910 is authenticated and provisioned, network device 910 can forward layer-2 control plane traffic to network management module 930 via network management module 920 such that network devices operatively coupled to network device 910 can be authenticated with provisioned by network management module 930 (the root network management module).

As illustrated in FIG. 8, network management module 930 can designate network management module 920 as a virtual root network management module. As a virtual root network management module, network management module 920 can function as a root network management module for a VLAN including various network devices (including other network management modules) within the control plane. For example, as illustrated in FIG. 8, network management module 930 can provide a VLAN identifier to network device 910 such that network device 910 joins a particular VLAN, and network management module 920 can be configured as a virtual root network management module for that VLAN. As shown in FIG. 8, network management module 920 (as the virtual root network management module) can define and send routing information such as, for example, routing tables to network device 910 using layer-3 communications. In other words, network management module 920 can provide routing instructions to network device 910 by addressing data packets to the IP address provided to network device 910 by network management module 930.

In some embodiments, network management module 920 as a virtual root network management module can monitor control plane traffic and/or data plane traffic (or can receive information related to control plane traffic and/or data plane traffic from network devices), and can update routing information. Network management module 920 can then send updated routing information to network device 910, as shown in FIG. 8. Similarly, in some embodiments, network management module 930 as the root network management module can send updated routing information to network management module 920 using the IP address provided to network management module 920 by network management module 930. Network management module 920 can then forward the updated routing information to network device 910 using the IP address provided to network device 910 by network management module 930. In some embodiments, network management module 920 updates routing information such as, for example, a routing table stored at a memory of network management module 920 based on updated routing information provided by network management module 930 before forwarding the updated routing information to network device 910. In some embodiments, network management module 920 forwards updated routing information to network device 910 without updating routing information at network management module 920.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language. A processor according to some embodiments includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; read-only memory ("ROM"); and random-access memory ("RAM") devices such as solid state or FLASH drives. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

While certain embodiments have been shown and described above, various changes in form and details may be made. For example, some features of embodiments that have been described in relation to one embodiment and/or process for provisioning a host device or network device can be useful in other embodiments and/or processes. Furthermore, embodiments discussed with respect to a control plane processor can also be applicable to a root control plane processor and/or a virtual root control plane processor. Additionally, embodiments described with reference to specific forms of communication such as communication between host device, network devices, network management modules, and external management entities via a network are also applicable to other forms of communication such as communication via a command or control plane. Some embodiments that have been described in relation to a software implementation can be implemented as digital or analog hardware. For example, software modules can be implemented on semiconductor chips. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. An apparatus, comprising:
 a memory; and
 a processor operatively coupled to the memory, a first network device, and a second network device, the processor configured to:
  authenticate the first network device based on a first key associated with the first network device, the first key defined based on a first network device identifier uniquely associated with the first network device and a first encryption identifier used to encrypt the first network device identifier,
  associate, in response to authenticating the first network device and based on the first network device identifier, a portion of the first network device with a first virtual network segment within a switch fabric control plane,
  authenticate the second network device based on a second key associated with the second network device, the second key defined based on a second network device identifier uniquely associated with the second network device and a second encryption identifier used to encrypt the second network device identifier,
  associate, in response to authenticating the second network device and based on the second network device, a portion of the second network device with a second virtual network segment within the switch fabric control plane,
  send, after associating the portion of the first network device with the first virtual network segment, a first control signal to the first network device, and
  send, after associating the portion of the second network device with the second virtual network segment, a second control signal to the second network device.

2. The apparatus of claim 1, wherein the association of the portion of the first network device with the first virtual network segment is based on an operational condition of the switch fabric control plane.

3. The apparatus of claim 1, wherein:
 the association of the portion of the first network device with the first virtual network segment is based on an operational condition of the switch fabric control plane,
 the operational condition of the switch fabric control plane is at least one of a processing load of at least one other network management device, a computational load of at least one other network management device, control traffic, a processing load of the first network device or the second network device, a computational load of the first network device or the second network device, or data traffic.

4. The apparatus of claim 1, wherein:
 the memory is configured to store a configuration table;
 the processor is configured to define, before associating the portion of the first network device with the first virtual network segment, the first virtual network segment based on the configuration table; and
 the processor is configured to define, before associating the portion of the second network device with the second virtual network segment, the second virtual network segment based on the configuration table.

5. The apparatus of claim 1, wherein:
 the processor is configured to associate the portion of the first network device with the first virtual network segment by sending a first layer-3 identifier and a first virtual network segment identifier to the first network device; and
 the processor is configured to associate the portion of the second network device with the second network segment by sending a second layer-3 identifier and a second virtual network segment identifier to the second network device.

6. The apparatus of claim 1, wherein the processor is configured to authenticate the first network device and the second network device using a port-based authentication protocol.

7. The apparatus of claim 1, wherein the processor is configured to determine that the apparatus is a root network management device in the switch fabric control plane based on an election with a network management device in the switch fabric control plane.

8. The apparatus of claim 1, wherein the processor is configured to determine that the apparatus is a root network management device in the switch fabric control plane based on a plurality of parameters of the apparatus and a plurality of parameters of a network management device in the switch fabric control plane.

9. The apparatus of claim 1, wherein the processor is configured to send device-specific provisioning information to the first virtual network segment when the first network device identifier exists in a configuration table stored in the memory, and
 the processor is configured to send default provision information to the first virtual network segment when the first network device identifier does not exist in the configuration table stored in the memory.

10. The apparatus of claim 1, wherein the processor does not have information about a physical location of the first network device or the second network device.

11. The apparatus of claim 1, wherein the first network device identifier is a medium access control (MAC) address of the first network device.

12. The apparatus of claim 1, wherein the first control signal is a routing instruction.

13. A method, comprising:
 authenticating, at a first time, a network device based on a key associated with the network device within a switch fabric control plane, the switch fabric control plane having a plurality of network devices including the network device, the key defined based on a network device identifier uniquely associated with the network device and an encryption identifier used to encrypt the network device identifier;
 defining a virtual network segment of a plurality of virtual network segments within the switch fabric control plane;
 associating, at a second time after the first time, a portion of the network device with the virtual network segment within the switch fabric control plane based on an operational condition of the switch fabric control plane; and
 sending, to the network device, a control signal including routing instructions associated with the virtual network segment.

14. The method of claim 13, wherein the operational condition of the switch fabric control plane is at least one of a processing load of at least one other network management device, a computational load of at least one other network management device, control traffic, a processing load of the first network device or the second network device, a computational load of the first network device or the second network device, or data traffic.

15. The method of claim 13, wherein associating the portion of the network device with the virtual network segment includes sending a first layer-3 identifier and a virtual network segment identifier to the network device.

16. The method of claim 13, wherein authenticating the network device includes authenticating the network device using a port-based authentication protocol.

17. The method of claim 13, further comprising:
determining a root network management device in the switch fabric control plane; and
sending, from the root network management device to the network device, the control signal.

18. The method of claim 13, further comprising:
sending device-specific provisioning information to the virtual network segment when the network device identifier exists in a configuration table; and
sending default provision information to the virtual network segment when the network device identifier does not exist in the configuration table.

19. A non-transitory processor-readable medium storing code representing instructions to be executed by a processor, the code comprising code to cause the processor to:
determine that the processor is included in a root network management device in a switch fabric control plane based on a plurality of parameters of the root network management device and a plurality of parameters of a network management device in the switch fabric control plane;
authenticate a first network device based on a first key associated with the first network device, the processor operatively coupled to the first network device and a second network device, the first key defined based on a first network device identifier uniquely associated with the first network device and a first encryption identifier used to encrypt the first network device identifier;
associate, in response to authenticating the first network device, a portion of the first network device with a first virtual network segment within the switch fabric control plane;
authenticate the second network device based on a second key associated with the second network device, the second key defined based on a second network device identifier uniquely associated with the second network device and a second encryption identifier used to encrypt the second network device identifier;
associate, in response to authenticating the second network device, a portion of the second network device with a second virtual network segment within the switch fabric control plane;
send, after associating the portion of the first network device with the first virtual network segment, a first routing instruction associated with the first virtual network segment to the first network device; and
send, after associating the portion of the second network device with the second virtual network segment, a second routing instruction associated with the second virtual network segment to the second network device.

20. The non-transitory processor-readable medium of claim 19, wherein the plurality of parameters of the root network management device includes at least one of a processing load, a computational load, control traffic, a processing load of the first network device or the second network device, a computational load of the first network device or the second network device, or data traffic.

* * * * *